(12) United States Patent
Hannuksela et al.

(10) Patent No.: US 12,088,971 B2
(45) Date of Patent: Sep. 10, 2024

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Miska Hannuksela, Tampere (FI); Emre Aksu, Tampere (FI); Kashyap Kammachi Sreedhar, Tampere (FI)

(73) Assignee: Nokia Technologies Oy, Espoo (FI)

( * ) Notice: Subject to any disclaimer, the term of this patent is extended or adjusted under 35 U.S.C. 154(b) by 34 days.

(21) Appl. No.: 17/786,766

(22) PCT Filed: Dec. 17, 2020

(86) PCT No.: PCT/FI2020/050847
§ 371 (c)(1),
(2) Date: Jun. 17, 2022

(87) PCT Pub. No.: WO2021/136880
PCT Pub. Date: Jul. 8, 2021

(65) Prior Publication Data
US 2023/0027058 A1 Jan. 26, 2023

(30) Foreign Application Priority Data
Dec. 31, 2019 (FI) ..................................... 20196140

(51) Int. Cl.
*G06F 16/71* (2019.01)
*H04N 9/804* (2006.01)
(Continued)

(52) U.S. Cl.
CPC ......... *H04N 9/8042* (2013.01); *H04N 19/105* (2014.11); *H04N 19/184* (2014.11)

(58) Field of Classification Search
CPC .............. G06F 16/71; H04N 21/85403; H04N 21/854; H04N 21/85; H04N 21/85406;
(Continued)

(56) References Cited

U.S. PATENT DOCUMENTS

2005/0276580 A1* 12/2005 Zacek ...................... H04N 5/85
386/331
2016/0165321 A1 6/2016 Denoual et al.
(Continued)

FOREIGN PATENT DOCUMENTS

CN 107534801 A 1/2018
CN 110100435 A 8/2019
(Continued)

OTHER PUBLICATIONS

Hannuksela, Miska M. "AHG12: Summary of HLS Proposals on Subpictures" Joint Video Experts Team (JVET) of ITU-T SG 16 WP 3 and ISO/IEC JTC 1/SC/WG 11, Oct. 2019.
(Continued)

*Primary Examiner* — Daquan Zhao
(74) *Attorney, Agent, or Firm* — Harrington & Smith

(57) ABSTRACT

The embodiments relate to a method for writing, in a container file, two or more subpicture tracks; writing, in the container file, a base track, which is intended to be resolved into a video bitstream; indicating, in the base track, a layout of subpictures; writing, in the container file, a sample group description entry indicative of a first subpicture track or a group of subpicture tracks for each subpicture position in the layout of subpictures, wherein the first subpicture track includes the subpicture sequence for the respective subpicture position and wherein any track among the group of subpicture tracks includes a valid subpicture sequence for the respective subpicture position; and indicating in the container file, samples of the base track for which the sample
(Continued)

group description entry is intended to be used for reconstructing the video bitstream. The embodiments also relate to a method for parsing, as well as technical equipment for implementing the method for writing and the method for parsing.

20 Claims, 6 Drawing Sheets

(51) Int. Cl.
*H04N 19/105* (2014.01)
*H04N 19/184* (2014.01)
*H04N 21/85* (2011.01)
*H04N 19/00* (2014.01)

(58) Field of Classification Search
CPC ........... H04N 19/00; H04N 21/234345; H04N 19/597
USPC ....... 386/326, 330, 239, 244, 245, 246, 248, 386/241
See application file for complete search history.

(56) References Cited

U.S. PATENT DOCUMENTS

| 2018/0277164 A1* | 9/2018 | Wang ................ H04N 21/84 |
| 2020/0228837 A1* | 7/2020 | Song ................ H04N 21/816 |
| 2021/0008482 A1 | 3/2021 | Takahashi et al. ............. 13/178 |

FOREIGN PATENT DOCUMENTS

| WO | WO-2017202799 A1 | 11/2017 |
| WO | WO-2019/002662 A1 | 1/2019 |
| WO | WO-2019/072795 A1 | 4/2019 |
| WO | WO 2019/234116 A1 | 6/2019 |
| WO | WO-2019221072 A1 | 11/2019 |
| WO | WO-2019/138929 A1 | 1/2021 |

OTHER PUBLICATIONS

Gruneberg, K. et al., "Subpicture support in 14496-15 for VVC", ISO/IEC JTC1/SC29/WG11 m50841 (version 1) MPEG Document Management System, 129$^{th}$ meeting, Oct. 2, 2019, Geneva, CH.
"Information technology—Coding of audio-visual objects—Part 15: Carriage of network abstraction layer (NAL) unit structured video in the ISO base media file format", MPEG document system, 128$^{th}$ meeting, Oct. 11, 2019, Geneva, CH.

* cited by examiner

METHOD, AN APPARATUS AND A COMPUTER PROGRAM PRODUCT FOR VIDEO ENCODING AND VIDEO DECODING

CROSS REFERENCE TO RELATED APPLICATION

This patent application is a U.S. National Stage application of International Patent Application Number PCT/FI2020/050847 filed Dec. 17, 2020, which is hereby incorporated by reference in its entirety, and claims priority to FI 20196140 filed Dec. 31, 2019.

TECHNICAL FIELD

The present solution generally relates to video encoding and video decoding.

BACKGROUND

This section is intended to provide a background or context to the invention that is recited in the claims. The description herein may include concepts that could be pursued but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Now there has been invented an improved method and technical equipment implementing the method. Various aspects include a method, an apparatus, and a computer readable medium comprising a computer program stored therein, which are characterized by what is stated in the independent claims. Various embodiments are disclosed in the dependent claims.

According to a first aspect, there is provided a method comprising writing, in a container file, two or more subpicture tracks; writing, in the container file, a base track, which is intended to be resolved into a video bitstream; indicating, in the base track, a layout of subpictures; writing, in the container file, a sample group description entry indicative of a first subpicture track or a group of subpicture tracks for each subpicture position in the layout of subpictures, wherein the first subpicture track comprises the subpicture sequence for the respective subpicture position and wherein any track among the group of subpicture tracks comprises a valid subpicture sequence for the respective subpicture position; and indicating in the container file, samples of the base track for which the sample group description entry is intended to be used for reconstructing the video bitstream.

According to a second aspect, there is provided a method, comprising parsing, from a base track of a container file, a layout of subpictures; parsing, from the container file, a sample group description entry indicative of a first subpicture track or a group of subpicture tracks for each subpicture position in the layout of subpictures, wherein the first subpicture track comprises the subpicture sequence for the respective subpicture position, and wherein any track among the group of subpicture tracks comprises a valid subpicture sequence for the respective subpicture position; selecting a second subpicture track from the group of subpicture tracks, when the sample group description entry is indicative of a group of subpicture tracks; parsing, from the container file, which set of samples of the base track the sample group description entry is intended to be used for reconstructing the video bitstream; reconstructing, from the container file, coded pictures of a video bitstream corresponding to the set of samples by including time-aligned samples of the first sub picture track or the second subpicture track for each subpicture position of the layout of subpictures.

According to a third aspect, there is provided an apparatus comprising means for writing, in a container file, two or more subpicture tracks; means for writing, in the container file, a base track, which is intended to be resolved into a video bitstream; means for indicating, in the base track, a layout of subpictures; means for writing, in the container file, a sample group description entry indicative of a first subpicture track or a group of subpicture tracks for each subpicture position in the layout of subpictures, wherein the first subpicture track comprises the subpicture sequence for the respective subpicture position and wherein any track among the group of subpicture tracks comprises a valid subpicture sequence for the respective subpicture position; and means for indicating in the container file, samples of the base track for which the sample group description entry is intended to be used for reconstructing the video bitstream.

According to an embodiment, the apparatus further comprises means for writing in the container file, a track reference from the base track to a list of entries, each identifying a subpicture track or a track group of subpicture tracks; and wherein the sample group description entry comprises, for each subpicture position in the layout of subpictures, an index of the list of entries for each subpicture position, the index being indicative of the first subpicture track or the group of subpicture tracks.

According to an embodiment, the sample group description entry comprises an indication if subpicture identification is carried in a parameter set or a picture header included in the base track.

According to an embodiment, the sample group description entry comprises one or more of the following:
- a length of picture identifier syntax element;
- a bit position of the first subpicture identifier syntax element;
- a flag indication if start code emulation prevention bytes are present before or within the subpicture identifier syntax element.

According to an embodiment, a sample entry of a subpicture track comprises one or more of the following:
- subpicture identifier;
- subpicture position identifier.

According to an embodiment, the apparatus further comprises means for writing, in the container file, a sample group for picture header NAL units.

According to a fourth aspect, there is provided an apparatus comprising means for parsing, from a base track of a container file, a layout of subpictures; means for parsing, from the container file, a sample group description entry indicative of a first subpicture track or a group of subpicture tracks for each subpicture position in the layout of subpictures, wherein the first subpicture track comprises the subpicture sequence for the respective subpicture position, and wherein any track among the group of subpicture tracks comprises a valid subpicture sequence for the respective subpicture position; means for selecting a second subpicture track from the group of subpicture tracks, when the sample group description entry is indicative of a group of subpicture tracks; means for parsing, from the container file, which set of samples of the base track the sample group description entry is intended to be used for reconstructing the video bitstream; means for reconstructing, from the container file, coded pictures of a video bitstream corresponding to the set of samples by including time-aligned samples of the first sub picture track or the second subpicture track for each subpicture position of the layout of subpictures.

According to an embodiment, the apparatus further comprises reading, from the container file, a track reference from the base track to a list of entries, each identifying a subpicture track or a track group of subpicture tracks; and wherein the sample group description entry comprises, for each subpicture position in the layout of subpictures, an index of the list of entries for each subpicture position, the index being indicative of the first subpicture tracks or the group of subpicture tracks.

According to an embodiment, the sample group description entry comprises an indication if subpicture identification is carried in a parameter set or a picture header included in the base track.

According to an embodiment, the sample group description entry comprises one or more of the following:
  a length of picture identifier syntax element;
  a bit position of the first subpicture identifier syntax element;
  a flag indication if start code emulation prevention bytes are present before or within the subpicture identifier syntax element.

According to an embodiment, a sample entry of a subpicture track comprises one or more of the following:
  subpicture identifier;
  subpicture position identifier.

According to an embodiment, an apparatus further comprises means for reading, from the container file, a sample group for picture header NAL units.

According to an embodiment, an apparatus further comprises means for indicating a mapping of subpicture identifiers to the layout of subpictures.

According to an embodiment, the means for indicating is configured to overwrite the subpicture identifier in a parameter set or a picture header by using one or more of the following:
  a) concluding if subpicture identifiers are carried in parameter sets and/or picture headers;
  b) if more than one parameter set or picture header contains subpicture identifiers, concluding a precedence order between parameter sets and picture headers and selecting the parameter set or the picture header that has the highest precedence;
  c) if a picture header is selected for overwriting, selecting the picture header for overwriting to be the picture header that is present in a sample or picture header of a sample grouping that is mapped to a sample in the base track;
  d) modifying the selected parameter set or picture header to contain the subpicture identifiers of selected subpicture tracks.

According to an embodiment, for option d), the apparatus comprises means for performing the modification as follows: starting from the bit position of a first subpicture identifier element and overwriting each subpicture identifier element value with a subpicture identifier from each selected subpicture track in the order specified in the sample group description entry.

According to an embodiment, the apparatus further comprises at least one processor and memory including computer program code.

According to a fourth aspect, there is provided a computer program product comprising computer program code configured to, when executed on at least one processor, cause an apparatus or a system to implement a method according to any of the embodiments.

According to an embodiment, a computer program product according to an embodiment is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

Figure 1:
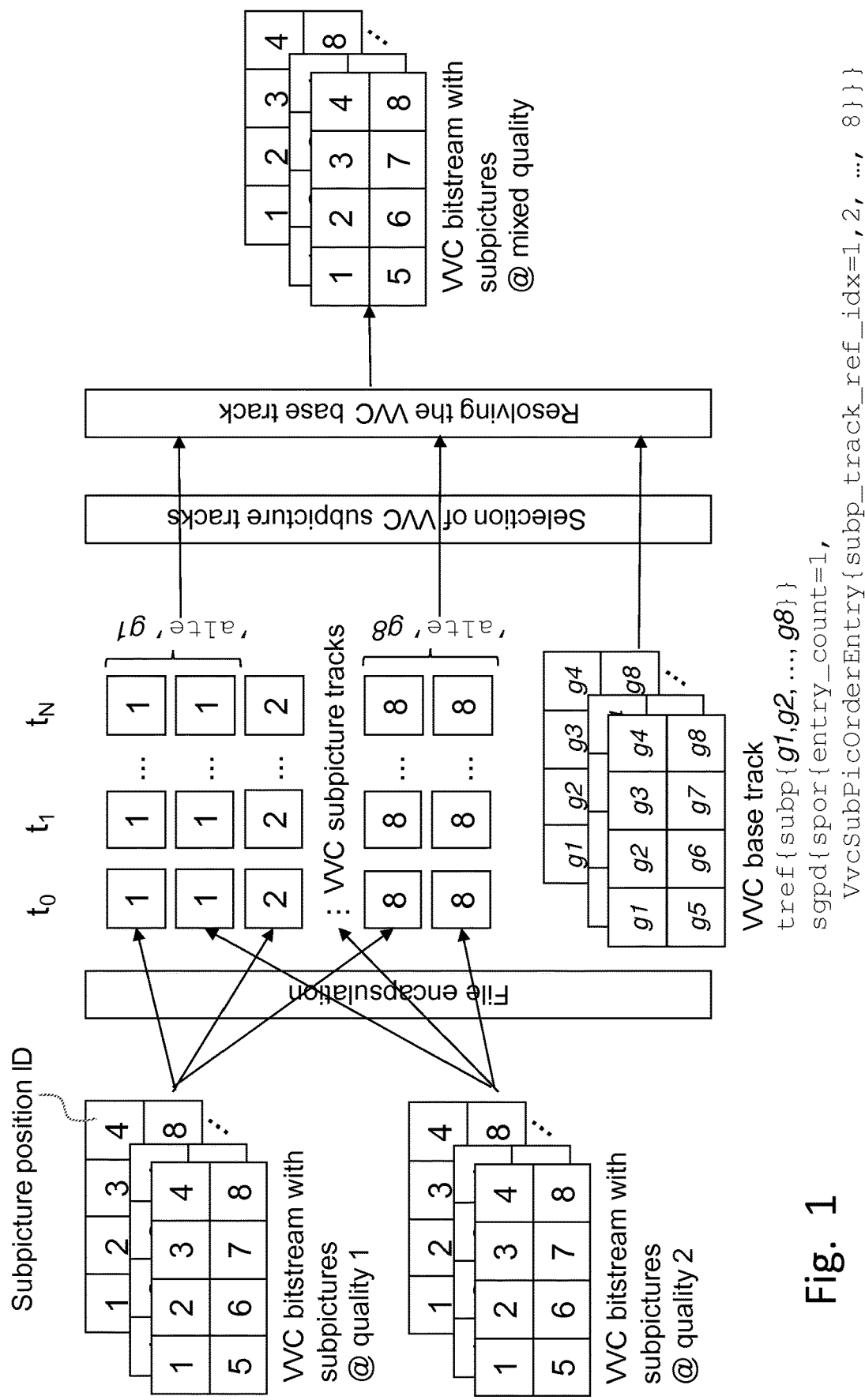
FIG. 1 shows a first example of using VVC subpicture tracks.

In the following, several embodiments will be described in the context of one video coding arrangement. It is to be noted, however, that the present embodiments are not necessarily limited to the this particular arrangement.

The Advanced Video Coding standard (which may be abbreviated AVC or H.264/AVC) was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organization for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding standard (which may be abbreviated HEVC or H.265/HEVC) was developed by the Joint Collaborative Team-Video Coding (JCT-VC) of VCEG and MPEG. The standard is published by both parent standardization organizations, and it is referred to as ITU-T Recommendation H.265 and ISO/IEC International Standard 23008-2, also known as MPEG-H Part 2 High Efficiency Video Coding (HEVC). Extensions to H.265/HEVC include scalable, multiview, three-dimensional, and fidelity range extensions, which may be referred to as SHVC, MV-HEVC, 3D-HEVC, and REXT, respectively. The references in this description to H.265/HEVC, SHVC, MV-HEVC, 3D-HEVC and REXT that have been made for the purpose of understanding definitions, structures or concepts of these standard specifications are to be understood to be references to the latest versions of these standards that were available before the date of this application, unless otherwise indicated.

The Versatile Video Coding standard (VVC, H.266, or H.266/VVC) is presently under development by the Joint Video Experts Team (JVET), which is a collaboration between the ISO/IEC MPEG and ITU-T VCEG.

Some key definitions, bitstream and coding structures, and concepts of H.264/AVC and HEVC and some of their extensions are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC standard—hence, they are described below jointly. The aspects of various embodiments are not limited to H.264/AVC or HEVC or their extensions, but rather the description is given for one possible basis on top of which the present embodiments may be partly or fully realized.

Video codec may comprise an encoder that transforms the input video into a compressed representation suited for storage/transmission and a decoder that can uncompress the compressed video representation back into a viewable form. The compressed representation may be referred to as a bitstream or a video bitstream. A video encoder and/or a video decoder may also be separate from each other, i.e. need not form a codec. The encoder may discard some information in the original video sequence in order to represent the video in a more compact form (that is, at lower bitrate).

Hybrid video codecs, for example ITU-T H.264, may encode the video information in two phases. At first, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Then, the prediction error, i.e. the difference between the predicted block of pixels and the original block of pixels, is coded. This may be done by transforming the difference in pixel values using a specified transform (e.g. Discreet Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction or current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Intra prediction utilizes the fact that adjacent pixels within the same picture are likely to be correlated. Intra prediction can be performed in spatial or transform domain, i.e., either sample values or transform coefficients can be predicted. Intra prediction may be exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

Video coding standards may specify the bitstream syntax and semantics as well as the decoding process for error-free bitstreams, whereas the encoding process might not be specified, but encoders may just be required to generate conforming bitstreams. Bitstream and decoder conformance can be verified with the Hypothetical Reference Decoder (HRD). The standards may contain coding tools that help in coping with transmission errors and losses, but the use of the tools in encoding may be optional and decoding process for erroneous bitstreams might not have been specified.

A syntax element may be defined as an element of data represented in the bitstream. A syntax structure may be defined as zero or more syntax elements present together in the bitstream in a specified order.

An elementary unit for the input to an encoder and the output of a decoder, respectively, in most cases is a picture. A picture given as an input to an encoder may also be referred to as a source picture, and a picture decoded by a decoded may be referred to as a decoded picture or a reconstructed picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of HEVC or alike. A component may be defined as an array or single sample from one of the three sample arrays (luma and two chroma) or the array or a single sample of the array that compose a picture in monochrome format.

A picture may be defined to be either a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays.

Some chroma formats may be summarized as follows:
In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.

Coding formats or standards may allow to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of VUI of H.264/AVC or HEVC.

Generally, the source video sequence(s) provided as input for encoding may either represent interlaced source content or progressive source content. Fields of opposite parity have been captured at different times for interlaced source content. Progressive source content contains captured frames. An encoder may encode fields of interlaced source content in two ways: a pair of interlaced fields may be coded into a coded frame or a field may be coded as a coded field. Likewise, an encoder may encode frames of progressive source content in two ways: a frame of progressive source content may be coded into a coded frame or a pair of coded fields. A field pair or a complementary field pair may be defined as two fields next to each other in decoding and/or output order, having opposite parity (i.e. one being a top field and another being a bottom field) and neither belonging to any other complementary field pair. Some video coding standards or schemes allow mixing of coded frames and coded fields in the same coded video sequence. Moreover, predicting a coded field from a field in a coded frame and/or predicting a coded frame for a complementary field pair (coded as fields) may be enabled in encoding and/or decoding.

Partitioning may be defined as a division of a set into subsets such that each element of the set is in exactly one of the subsets.

In a draft version of H.266/VVC, the following partitioning applies. It is noted that what is described here might still evolve in later draft versions of H.266/VVC until the standard is finalized. Pictures are partitioned into coding tree units (CTUs) with a maximum size of 128×128, although encoders may choose to use a smaller size, such as 64×64. A coding tree unit (CTU) is first partitioned by a quaternary tree (a.k.a. quadtree) structure. Then the quaternary tree leaf nodes can be further partitioned by a multi-type tree structure. There are four splitting types in multi-type tree structure, vertical binary splitting, horizontal binary splitting, vertical ternary splitting, and horizontal ternary splitting. The multi-type tree leaf nodes are called coding units (CUs). CU, PU and TU have the same block size, unless the CU is too large for the maximum transform length. A segmentation structure for a CTU is a quadtree with nested multi-type tree using binary and ternary splits, i.e. no separate CU, PU and TU concepts are in use except when needed for CUs that have a size too large for the maximum transform length. A CU can have either a square or rectangular shape.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF).

The deblocking loop filter may include multiple filtering modes or strengths, which may be adaptively selected based on the features of the blocks adjacent to the boundary, such as the quantization parameter value, and/or signaling included by the encoder in the bitstream. For example, the deblocking loop filter may comprise a normal filtering mode and a strong filtering mode, which may differ in terms of the number of filter taps (i.e. number of samples being filtered on both sides of the boundary) and/or the filter tap values. For example, filtering of two samples along both sides of the boundary may be performed with a filter having the impulse response of (3 7 9 −3)/16, when omitting the potential impact of a clipping operation.

The motion information may be indicated with motion vectors associated with each motion compensated image block in video codecs. Each of these motion vectors represents the displacement of the image block in the picture to be coded (in the encoder side) or decoded (in the decoder side) and the prediction source block in one of the previously coded or decoded pictures. In order to represent motion vectors efficiently those may be coded differentially with respect to block specific predicted motion vectors. The predicted motion vectors may be created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index may be predicted from adjacent blocks and/or co-located blocks in temporal reference picture. Moreover, high efficiency video codecs may employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

Video codecs may support motion compensated prediction from one source image (uni-prediction) and two sources (bi-prediction). In the case of uni-prediction a single motion vector is applied whereas in the case of bi-prediction two motion vectors are signaled and the motion compensated predictions from two sources are averaged to create the final sample prediction. In the case of weighted prediction, the relative weights of the two predictions can be adjusted, or a signaled offset can be added to the prediction signal.

In addition to applying motion compensation for inter picture prediction, similar approach can be applied to intra picture prediction. In this case the displacement vector indicates where from the same picture a block of samples can be copied to form a prediction of the block to be coded or decoded. This kind of intra block copying methods can improve the coding efficiency substantially in presence of repeating structures within the frame—such as text or other graphics.

The prediction residual after motion compensation or intra prediction may be first transformed with a transform kernel (like DCT) and then coded. The reason for this is that often there still exists some correlation among the residual and transform can in many cases help reduce this correlation and provide more efficient coding.

Video encoders may utilize Lagrangian cost functions to find optimal coding modes, e.g. the desired Macroblock mode and associated motion vectors. This kind of cost function uses a weighting factor λ to tie together the (exact or estimated) image distortion due to lossy coding methods and the (exact or estimated) amount of information that is required to represent the pixel values in an image area:

$$C=D+\lambda R \quad \text{(Eq. 1)}$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Some codecs use a concept of picture order count (POC). A value of POC is derived for each picture and is non-decreasing with increasing picture position in output order. POC therefore indicates the output order of pictures. POC may be used in the decoding process for example for implicit scaling of motion vectors and for reference picture list initialization. Furthermore, POC may be used in the verification of output order conformance.

In video coding standards, a compliant bit stream must be able to be decoded by a hypothetical reference decoder that may be conceptually connected to the output of an encoder and consists of at least a pre-decoder buffer, a decoder and an output/display unit. This virtual decoder may be known as the hypothetical reference decoder (HRD) or the video buffering verifier (VBV). A stream is compliant if it can be decoded by the HRD without buffer overflow or, in some cases, underflow. Buffer overflow happens if more bits are to be placed into the buffer when it is full. Buffer underflow happens if some bits are not in the buffer when said bits are to be fetched from the buffer for decoding/playback. One of the motivations for the HRD is to avoid so-called evil bitstreams, which would consume such a large quantity of resources that practical decoder implementations would not be able to handle.

HRD models may include instantaneous decoding, while the input bitrate to the coded picture buffer (CPB) of HRD may be regarded as a constraint for the encoder and the bitstream on decoding rate of coded data and a requirement for decoders for the processing rate. An encoder may include a CPB as specified in the HRD for verifying and controlling that buffering constraints are obeyed in the encoding. A decoder implementation may also have a CPB that may but does not necessarily operate similarly or identically to the CPB specified for HRD.

A Decoded Picture Buffer (DPB) may be used in the encoder and/or in the decoder. There may be two reasons to buffer decoded pictures, for references in inter prediction and for reordering decoded pictures into output order. Some coding formats, such as HEVC, provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output. An HRD may also include a DPB. DPBs of an HRD and a decoder implementation may but do not need to operate identically.

Output order may be defined as the order in which the decoded pictures are output from the decoded picture buffer (for the decoded pictures that are to be output from the decoded picture buffer).

A decoder and/or an HRD may comprise a picture output process. The output process may be considered to be a process in which the decoder provides decoded and cropped pictures as the output of the decoding process. The output process may be a part of video coding standards, e.g. as a part of the hypothetical reference decoder specification. In output cropping, lines and/or columns of samples may be removed from decoded pictures according to a cropping rectangle to form output pictures. A cropped decoded picture may be defined as the result of cropping a decoded picture based on the conformance cropping window specified e.g. in the sequence parameter set that is referred to by the corresponding coded picture.

One or more syntax structures for (decoded) reference picture marking may exist in a video coding system. An encoder generates an instance of a syntax structure e.g. in each coded picture, and a decoder decodes an instance of the syntax structure e.g. from each coded picture. For example, the decoding of the syntax structure may cause pictures to be adaptively marked as "used for reference" or "unused for reference".

A reference picture set (RPS) syntax structure of HEVC is an example of a syntax structure for reference picture marking. A reference picture set valid or active for a picture includes all the reference pictures that may be used as reference for the picture and all the reference pictures that are kept marked as "used for reference" for any subsequent pictures in decoding order. The reference pictures that are kept marked as "used for reference" for any subsequent pictures in decoding order but that are not used as reference picture for the current picture or image segment may be considered inactive. For example, they might not be included in the initial reference picture list(s).

In some coding formats and codecs, a distinction is made between so-called short-term and long-term reference pictures. This distinction may affect some decoding processes such as motion vector scaling. Syntax structure(s) for marking reference pictures may be indicative of marking a picture as "used for long-term reference" or "used for short-term reference".

In some coding formats, reference picture for inter prediction may be indicated with an index to a reference picture list. In some codecs, two reference picture lists (reference picture list 0 and reference picture list 1) are generated for each bi-predictive (B) slice, and one reference picture list (reference picture list 0) is formed for each inter-coded (P) slice.

In VVC, reference picture lists are indicated directly in a reference picture list syntax structure. When a picture is present in any reference picture list of the current picture (within active or inactive entries of any reference picture list), it marked as "used for long-term reference" or "used for short-term reference". When a picture is present in no reference picture list of the current picture, it is marked as "unused for reference". The abbreviation RPL may be used to refer to the reference picture list syntax structure and/or to one or more reference picture lists. The number of active entries in a reference picture list may be indicated by an encoder and/or decoded by a decoder, and may indicate the number of pictures starting from the first list entry that may be used as reference for prediction of the current picture. The entries in a reference picture list that are no among the active entries may be defined to be inactive entries, are not used as reference for prediction of the current picture, and may be used as reference for prediction of subsequent pictures in decoding order.

A Decoded Picture Buffer (DPB) may be used in the encoder and/or in the decoder. There may be two reasons to buffer decoded pictures, for references in inter prediction and for reordering decoded pictures into output order. Since some codecs, such as VVC, provide flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

Scalable video coding refers to coding structure where one bitstream can contain multiple representations of the content at different bitrates, resolutions or frame rates. In these cases, the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream may include a "base layer" providing the lowest quality video available and one or more enhancement layers that enhance the video quality when received and decoded together with the lower layers. In order to improve coding efficiency for the enhancement layers, the coded representation of that layer may depend on the lower layers. E.g. the motion and mode information of the enhancement layer can be predicted from lower layers. Similarly, the pixel data of the lower layers can be used to create prediction for the enhancement layer.

A scalable video codec for quality scalability (also known as Signal-to-Noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use e.g. with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer.

Spatial scalability: Base layer pictures are coded at a lower resolution (i.e. have fewer samples) than enhancement layer pictures. Spatial scalability and quality scalability may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

Region-of-interest (ROI) scalability: An enhancement layer represents of spatial subset of the base layer. ROI scalability may be used together with other types of scalability, e.g. quality or spatial scalability so that the enhancement layer provides higher subjective quality for the spatial subset.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

In all of the above scalability cases, base layer information could be used to code enhancement layer to minimize the additional bitrate overhead.

Scalability can be enabled in two basic ways. Either by introducing new coding modes for performing prediction of pixel values or syntax from lower layers of the scalable representation or by placing the lower layer pictures to the reference picture buffer (decoded picture buffer, DPB) of the higher layer.

The first approach is more flexible and thus can provide better coding efficiency in most cases. However, the second, reference frame-based scalability, approach can be implemented very efficiently with minimal changes to single layer codecs while still achieving majority of the coding efficiency gains available. Essentially a reference frame based scalability codec can be implemented by utilizing the same hardware or software implementation for all the layers, just taking care of the DPB management.

An elementary unit for the output of encoders of some coding formats, such as HEVC and VVC, and the input of decoders of some coding formats, such as HEVC and VVC, is a Network Abstraction Layer (NAL) unit. For transport over packet-oriented networks or storage into structured files, NAL units may be encapsulated into packets or similar structures.

A byte stream format may be specified for NAL unit streams for transmission or storage environments that do not provide framing structures. The byte stream format separates NAL units from each other by attaching a start code in front of each NAL unit. To avoid false detection of NAL unit boundaries, encoders may run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the byte stream format is in use or not.

A NAL unit may be defined as a syntax structure containing an indication of the type of data to follow and bytes containing that data in the form of a raw byte sequence payload (RBSP) interspersed as necessary with emulation prevention bytes. A RBSP may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In VVC, a two-byte NAL unit header is used for all specified NAL unit types, while in other codecs NAL unit header may be similar to that in VVC.

In VVC, the NAL unit header comprises a five-bit NAL unit type indication (nal_unit_type), a three-bit nuh_temporal_id_plus1 indication for temporal level or sub-layer (may be required to be greater than or equal to 1) and a six-bit nuh_layer_id syntax element. The nuh_temporal_id_plus1 syntax element may be regarded as a temporal identifier for the NAL unit, and a zero-based Temporal Id variable may be derived as follows: TemporalId=nuh_temporal_id_plus1−1. The abbreviation TID may be used to interchangeably with the TemporalId variable. TemporalId equal to 0 corresponds to the lowest temporal level. The value of nuh_temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream. Such temporal scalable layer may comprise VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units may be coded slice NAL units. In HEVC and VVC, VCL NAL units contain syntax elements representing one or more CUs. In HEVC and VVC, the NAL unit type value within a certain range indicates a VCL NAL unit, and the VCL NAL unit type may indicate a picture type.

Images can be split into independently codable and decodable image segments (e.g. slices or tiles or tile groups). Such image segments may enable parallel processing, "Slices" in this description may refer to image segments constructed of certain number of basic coding units that are processed in default coding or decoding order, while "tiles" may refer to image segments that have been defined as rectangular image regions. A tile group may be defined as a group of one or more tiles. Image segments may be coded as separate units in the bitstream, such as VCL NAL units in HEVC and VVC. Coded image segments may comprise a header and a payload, wherein the header contains parameter values needed for decoding the payload.

In the HEVC standard, a picture can be partitioned in tiles, which are rectangular and contain an integer number of CTUs. In the HEVC standard, the partitioning to tiles forms a grid that may be characterized by a list of tile column widths (in CTUs) and a list of tile row heights (in CTUs). Tiles are ordered in the bitstream consecutively in the raster scan order of the tile grid. A tile may contain an integer number of slices.

In the HEVC, a slice consists of an integer number of CTUs. The CTUs are scanned in the raster scan order of CTUs within tiles or within a picture, if tiles are not in use. A slice may contain an integer number of tiles or a slice can be contained in a tile. Within a CTU, the CUs have a specific scan order.

In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL (Network Abstraction Layer) unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In a draft version of VVC, the partitioning of pictures into tiles is defined as follows. A picture is divided into one or more tile rows and one or more tile columns. The partitioning of a picture to tiles forms a tile grid that may be characterized by a list of tile column widths (in CTUs) and a list of tile row heights (in CTUs). A tile is a sequence of coding tree units (CTUs) that covers one "cell" in the tile grid, i.e., a rectangular region of a picture.

In a draft version of VVC, the partitioning of pictures into slices is defined as follows. Two modes of slices are supported, namely the raster-scan slice mode and the rectangular slice mode. In the raster-scan slice mode, a slice contains a sequence of tiles in a tile raster scan of a picture. In the rectangular slice mode, a slice either contains an integer number of complete tiles that collectively form a rectangular region of the picture or an integer number of complete CTU rows of a tile. A slice is a VCL NAL unit.

In a draft version of VVC, a slice (a.k.a. a coded slice) may comprise a slice header and slice data. A slice header may be defined as a part of a coded slice containing the data elements pertaining to all tiles or CTU rows within a tile represented in the slice A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. An MCTS sequence may be defined as a sequence of respective MCTSs in one or more coded video sequences or alike. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures. A motion-constrained tile set may be regarded as an independently coded tile set, since it may be decoded without the other tile sets.

It is noted that sample locations used in inter prediction may be saturated by the encoding and/or decoding process so that a location that would be outside the picture otherwise is saturated to point to the corresponding boundary sample of the picture. Hence, if a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

A draft VVC standard supports subpictures (a.k.a. subpictures). A subpicture may be defined as a rectangular region of one or more slices within a picture, wherein the one or more slices are complete. Consequently, a subpicture consists of one or more slices that collectively cover a rectangular region of a picture. The slices of a subpicture may be required to be rectangular slices. Partitioning of a picture to subpictures (a.k.a. a subpicture layout or a layout of subpictures) may be indicated in and/or decoded from an SPS. One or more of the following properties may be indicated (e.g. by an encoder) or decoded (e.g. by a decoder) or inferred (e.g. by an encoder and/or a decoder) for the subpictures collectively or per each subpicture individually: i) whether or not a subpicture is treated as a picture in the decoding process; in some cases, this property excludes in-loop filtering operations, which may be separately indicated/decoded/inferred; ii) whether or not in-loop filtering operations are performed across the subpicture boundaries. Treating a subpicture as a picture in a decoding process may comprise saturating the sample locations in inter prediction that would otherwise be outside the subpicture onto the subpicture boundary.

It needs to be understood that embodiments described with reference to MCTSs could likewise be realized with subpictures (as specified for the draft VVC standard), and embodiments described with reference to subpictures could likewise be realized with MCTSs (as described above).

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Some coding formats specify parameter sets that may carry parameter values needed for the decoding or reconstruction of decoded pictures. Parameters that remain unchanged through a coded video sequence may be included in a sequence parameter set (SPS). If a CVS contains multiple layers, an SPS may be active for a subset of the layers only. In addition to the parameters that may be needed by the decoding process, the sequence parameter set may optionally contain video usability information (VUI), which includes parameters that may be important for buffering, picture output timing, rendering, and resource reservation. A picture parameter set (PPS) contains such parameters that are likely to be unchanged in several coded pictures. A picture parameter set may include parameters that can be referred to by the coded image segments of one or more coded pictures.

A decoding parameter set (DPS) may carry parameters applying to a bitstream. A DPS may be specified to contain properties and/or constraints that are not required for decoding VCL NAL units. A video parameter set (VPS) may carry parameters applying collectively to multiple layers. An adaptation parameter set (APS) may be defined as a syntax structure that applies to zero or more slices. There may be different types of adaptation parameter sets. An adaptation parameter set may for example contain filtering parameters for a particular type of a filter. In a draft VVC standard, three types of APSs are specified carrying parameters for one of: adaptive loop filter (ALF), luma mapping with chroma scaling (LMCS), and scaling lists. A scaling list may be defined as a list that associates each frequency index with a scale factor for the scaling process, which multiplies transform coefficient levels by a scaling factor, resulting in transform coefficients.

A parameter set may be activated when it is referenced e.g. through its identifier. For example, a header of an image segment, such as a slice header, may contain an identifier of the PPS that is activated for decoding the coded picture containing the image segment. A PPS may contain an identifier of the SPS that is activated, when the PPS is activated. An activation of a parameter set of a particular type may cause the deactivation of the previously active parameter set of the same type. In addition to or instead of activating a parameter set, the parameter set may be referenced or referred to by a syntax structure containing the identifier of the parameter set. For example, a slice header may reference a PPS whose identifier is included in the slice header and an SPS whose identifier is included in the referenced PPS.

In a draft VVC standard, the PPS syntax includes a 1-bit syntax element (i.e. a flag) named mixed_nalu_types_in_pic_flag. When equal to 1, mixed_nalu_types_in_pic_flag specifies that each picture referring to the PPS has more than one VCL NAL unit and that the VCL NAL units do not have the same value of nal_unit_type and that the picture is not an IRAP picture. mixed_nalu_types_in_pic_flag equal to 0 specifies that each picture referring to the PPS has one or more VCL NAL units and the VCL NAL units of each picture referring to the PPS have the same value of nal_unit_type.

Instead of or in addition to parameter sets at different hierarchy levels (e.g. sequence and picture), video coding formats may include header syntax structures, such as a sequence header or a picture header. A sequence header may precede any other data of the coded video sequence in the bitstream order. A picture header may precede any coded video data for the picture in the bitstream order.

In VVC, a picture header (PH) may be defined as a syntax structure containing syntax elements that apply to all slices of a coded picture. In other words, contains information that is common for all slices of the coded picture associated with the PH. A picture header syntax structure is specified as an RBSP and is contained in a NAL unit.

The phrase along the bitstream (e.g. indicating along the bitstream) or along a coded unit of a bitstream (e.g. indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

A coded picture is a coded representation of a picture.

An access unit may comprise coded video data for a single time instance and associated other data. In VVC, an access unit (AU) may be defined as a set picture units (PUs) that belong to different layers and contain coded pictures associated with the same time for output from the decoded picture buffer (DPB). In VVC, a picture unit (PU) may be defined as a set of NAL units that are associated with each other according to a specified classification rule, are consecutive in decoding order, and contain exactly one coded picture. In addition to containing the VCL NAL units of the coded picture, a picture unit may also contain non-VCL NAL units.

It may be required that coded pictures appear in certain order within an access unit. For example, a coded picture with nuh_layer_id equal to nuhLayerIdA may be required to precede, in decoding order, all coded pictures with nuh_layer_id greater than nuhLayerIdA in the same access unit.

A bitstream may be defined as a sequence of bits, which may in some coding formats or standards be in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of bitstream (EOB) NAL unit and which is the last NAL unit of the bitstream.

A coded video sequence (CVS) may be defined as such a sequence of coded pictures in decoding order that is independently decodable and is followed by another coded video sequence or the end of the bitstream.

A coded layer video sequence (CLVS) may be defined as a sequence of picture units (PUs) with the same scalable layer (e.g. with the same value of nuh_layer_id in VVC) that consists, in decoding order, of a CLVS Start Picture Unit (CLVSS PU), followed by zero or more PUs that are not CLVSS PUs, including all subsequent PUs up to but not including any subsequent PU that is a CLVSS PU. A picture unit (PU) may be defined as a coded picture and all non-VCL NAL units associated with the coded picture. A CLVSS PU may be defined as a PU that is allowed to start a CLVS, i.e. that can start a decoding process of the layer. A CLVSS PU may for example comprise an IRAP picture or a gradual decoding refresh (GDR) picture.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder or a VVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. An open GOP coding structure is potentially more efficient in the compression compared to a closed GOP coding structure, due to a larger flexibility in selection of reference pictures.

When describing video codecs and example embodiments, the following description may be used to specify the writing and/or parsing processes of each syntax element:

u(n): unsigned integer using n bits. When n is "v" in the syntax table, the number of bits varies in a manner dependent on the value of other syntax elements. The paring process for this descriptor is specified by n next bits from the bitstream interpreted as a binary representation of an unsigned integer with the most significant bit written first.

ue(v): unsigned integer Exponential-Golomb-coded (a.k.a. exp-Golomb coded) syntax element with the left bit first.

An Exponential-Golomb bit string may be converted to a code number (codeNum) for example using the following table:

| Bit string | codeNum |
| --- | --- |
| 1 | 0 |
| 0 1 0 | 1 |
| 0 1 1 | 2 |
| 0 0 1 0 0 | 3 |
| 0 0 1 0 1 | 4 |
| 0 0 1 1 0 | 5 |
| 0 0 1 1 1 | 6 |
| 0 0 0 1 0 0 0 | 7 |
| 0 0 0 1 0 0 1 | 8 |
| 0 0 0 1 0 1 0 | 9 |
| . . . | . . . |

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). The ISO file format is the base for derivation of all the above mentioned file formats (excluding the ISO file format itself). These file formats (including the ISO file format itself) are generally called the ISO family of file formats.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. The type of the box may be indicated with a 32-bit unsigned integer or equivalently with a four-character code (4CC), which may be written out in single quotes, e.g. 'mdat'. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to ISOBMFF, a file includes metadata encapsulated into boxes and may also include media data encapsulated into boxes. Media data may alternatively be present in other file(s) that a referenced by a file conforming to ISOBMFF. A FullBox is a box that additionally contains an 8-bit version field and a 24-bit flags field in its box header. The syntax of boxes may be specified using the syntax description language (SDL) defined in ISO/IEC 14496-1.

In files conforming to the ISO base media file format, the media data may be provided in a media data 'mdat' box (a.k.a. MediaDataBox). A file conforming to ISOBMFF may contain zero or more 'mdat' boxes.

An identified media data box (a.k.a. IdentifiedMediaDataBox, 'imda') may have the same semantics as a MediaDataBox has but it additionally contains an identifier that is used in setting up data references to the contained media data. The identifier may for example be the first element contained by the identified media data box. The syntax of an identified media data box may be specified as follows, where imda_identifier is the identifier of the box. It is noted that while imda_identifier of type 32-bit unsigned integer is used in the syntax, other field lengths and other basic data types (e.g., string) could be possible in similar identified media data box structures. Syntax of an identified meta data box is provided below:

aligned(8) class IdentifiedMediaDataBox extends Box ('imda') {
  unsigned int(32) imda_identifier;
  bit(8) data[ ]; //until the end of the box
}

Wherever a media data box, an 'mdat' box, or a MediaDataBox is referred, the description equally applies to an IdentifiedMediaDataBox.

In files conforming to the ISO base media file format, the movie 'moov' box (a.k.a. MovieBox) may be used to enclose the metadata. In some cases, for a file to be operable, both of the media data and movie boxes may be required to be present. The movie 'moov' box may include one or more tracks, and each track may reside in one corresponding TrackBox ('trak'). A track may be one of the many types, including a media track that refers to samples formatted according to a media compression format (and its encapsulation to the ISO base media file format). A track may be regarded as a logical channel. TrackBox contains a TrackHeaderBox, which comprises a track identifier, i.e. track_ID syntax element, which is an integer that uniquely identifies the track over the entire life-time of this presentation.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used, and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited, and the use cases mentioned above be realized.

In some examples, the media samples for the movie fragments may reside in an mdat box, if they are in the same file as the moov box. For the metadata of the movie fragments, however, a 'moof' box may be provided. The 'moof' box may include the information for a certain duration of playback time that would previously have been in the 'moov' box. The moov box may still represent a valid movie on its own, but in addition, it may include an 'mvex' box indicating that movie fragments will follow in the same file. The movie fragments may extend the presentation that is associated to the 'moov' box in time.

Within the movie fragment there may be a set of track fragments, including anywhere from zero to a plurality per track. The track fragments may in turn include anywhere from zero to a plurality of track runs (a.k.a. track fragment runs), each of which document is a contiguous run of samples for that track. Within these structures, many fields are optional and can be defaulted. The metadata that may be included in the 'moof' box may be limited to a subset of the metadata that may be included in a moov box and may be coded differently in some cases. Details regarding the boxes that can be included in a 'moof box may be found from the ISO base media file format specification. A self-contained movie fragment may be defined to consist of a 'moof' box and an mdat box that are consecutive in the file order and where the mdat box contains the samples of the movie fragment (for which the 'moof' box provides the metadata) and does not contain samples of any other movie fragment (i.e. any other 'moof' box).

TrackBoxes and track fragments (in TrackFragmentBox) comprise decoding and composition timing information for the samples in the scope of the TrackBox and the track fragment, respectively. A decoding time indicates the time when the sample is intended to be decoded, and a composition time indicates the time when the sample is intended to be played. Two samples in different tracks may be regarded as time-aligned when their decoding times or composition times are identical. The term time-aligned may refer to either or both alignment in decoding times and/or composition times. Sometimes, the term time-aligned may refer to alignment in decoding times only.

The track reference mechanism can be used to associate tracks with each other. The TrackReferenceBox includes box(es), each of which provides a reference from the containing track to a set of other tracks identified by their track_ID value(s) or, as explained below, by their track_group_id value(s). These references are labeled through the box type (i.e. the four-character code of the box) of the contained box(es).

TrackGroupBox, which is contained in TrackBox, enables indication of groups of tracks where each group shares a particular characteristic or the tracks within a group have a particular relationship. The box contains zero or more boxes, and the particular characteristic or the relationship is indicated by the box type of the contained boxes. The contained boxes are of type TrackGroupTypeBox or are derived from TrackGroupTypeBox. TrackGroupTypeBox is like a FullBox but also includes an identifier, which can be used to conclude the tracks belonging to the same track group. The tracks that contain the same type of a contained box within the TrackGroupBox and have the same identifier value within these contained boxes belong to the same track group.

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox ('sbgp' box) represents the assignment of samples to sample groups; and (2) a SampleGroupDescriptionBox ('sgpd' box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

Mapping a sample to a sample group description index equal to 0 indicates that the sample is a member of no group of this type. If the sum of the sample count in a SampleToGroupBox is less than the total sample count, or there is no SampleToGroupBox that applies to some samples (e.g. it is absent from a track fragment), then those samples are associated with the group identified by the default_group_description_index in the SampleGroupDescriptionBox, if any, or else with no group. Thus, the default sample group description index, i.e. default_group_description_index in SampleGroupDescriptionBox, specifies the index of the sample group description entry which applies to all samples in the track for which no sample to group mapping is provided through a SampleToGroupBox. When default_group_description_index is not present in SampleGroupDescriptionBox, it is inferred to be equal to zero (indicating that the samples are mapped to no group description of this type).

Several types of stream access points (SAPs) have been specified in ISOBMFF, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

Stream access points (which may also or alternatively be referred to as layer access point) for layered coding may be defined similarly in a layer-wise manner. A SAP for layer may be defined as a position in a layer (or alike) that enables playback of the layer to be started using only the information from that position onwards assuming that the reference layers of the layer have already been decoded earlier.

A stream access point (SAP) sample group as specified in ISOBMFF identifies samples as being of the indicated SAP type. The grouping_type_parameter for the SAP sample group comprises the fields target_layers and layer_id_method_idc. target_layers specifies the target layers for the indicated SAPs. The semantics of target_layers may depend on the value of layer_id_method_idc. layer_id_method_idc specifies the semantics of target_layers. layer_id_method_idc equal to 0 specifies that the target layers consist of all the layers represented by the track. The sample group description entry for the SAP sample group comprises the fields dependent_flag and SAP_type. dependent_flag may be required to be 0 for non-layered media. dependent_flag equal to 1 specifies that the reference layers, if any, for predicting the target layers may have to be decoded for accessing a sample of this sample group. dependent_flag equal to 0 specifies that the reference layers, if any, for predicting the target layers need not be decoded for accessing any SAP of this sample group. sap_type values in the range of 1 to 6, inclusive, specify the SAP type, of the associated samples.

A sync sample may be defined as a sample corresponding to SAP type 1 or 2. A sync sample can be regarded as a media sample that starts a new independent sequence of samples; if decoding starts at the sync sample, it and succeeding samples in decoding order can all be correctly decoded, and the resulting set of decoded samples forms the correct presentation of the media starting at the decoded sample that has the earliest composition time. Sync samples can be indicated with the SyncSampleBox (for those samples whose metadata is present in a TrackBox) or within sample flags (more specifically the sample_is_non_sync_sample flag) indicated or inferred for track fragment runs.

A draft amendment of ISO/IEC 14496-15 includes a specification of an alternative for extraction ('alte') track group. Members of an 'alte' track group are alternatives to be used as a source for extraction. For HEVC, members of the track group with track_group_type equal to 'alte' may be defined to be alternatives to be used as a source for 'scal' or 'sabt' track reference. A file writer may indicate in a file that an 'alte' track group contains tracks that are alternatives to be used as a source for extraction.

The identifier for the 'alte' track group may be taken from the same numbering space as the identifier for tracks. In other words, the identifier for the 'alte' track group may be required to differ from all the track identifier values. Consequently, the 'alte' track group identifier may be used in places where track identifier is conventionally used. Specifically, the 'alte' track group identifier may be used as a track reference indicating the source for extraction. The value of (flags & 1) may be set equal to 1 in a TrackGroupTypeBox of type 'alte' to indicate the uniqueness of track_group_id as specified in ISO/IEC 14496-12.

A TrackReferenceTypeBox of reference_type equal to track_ref 4cc may list the track_group_id value(s) of an 'alte' track group(s) of containing the same alte_track_ref 4cc value in addition to or instead of track ID values. For example, an extractor track may, through a 'scal' track reference, point to an 'alte' track group in addition to or instead of individual tracks. Any single track of the 'alte' track group is a suitable source for extraction. A player or a file reader or alike may change the source track for extraction at a position where the track switched to has a sync sample or a SAP sample of type 1 or 2.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a HandlerBox ('hdlr') box indicating the structure or format of the 'meta' box contents. The meta box may list and characterize any number of items that can be referred and each one of them can be associated with a file name and are uniquely identified with the file by item identifier (item_id) which is an integer value. The metadata items may be for example stored in the Item Data Box ('idat') box of the meta box or in an 'mdat' box or reside in a separate file. If the metadata is located external to the file then its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents. The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more Item PropertyAssociationBox(es) that associate items with item properties.

An Entity grouping is similar to track grouping but enables grouping of both tracks and items (e.g. image items) in the same group. The syntax of an entity grouping may be specified as follows:

```
aligned(8) class EntityToGroupBox(grouping_type, version,
flags)
extends FullBox (grouping_type, version, flags) {
   unsigned int(32) group_id;
   unsigned int(32) num_entities_in_group;
   for (i=0; i<num_entities_in_group; i++)
      unsigned int(32) entity_id;
}
``` group_id is a non-negative integer assigned to the particular grouping that may not be equal to any group_id value of any other EntityToGroupBox, any item_ID value of the hierarchy level (file, movie. or track) that contains the GroupsListBox (containing the EntityToGroupBox), or any track_ID value (when the GroupsListBox is contained in the file level). num_entities_in_group specifies the number of entity_id values mapped to this entity group. entity_id is resolved to an item, when an item with item_ID equal to entity_id is present in the hierarchy level (file, movie or track) that contains the GroupsListBox (containing the EntityToGroupBox), or to a track, when a track with track_ID equal to entity_id is present and the GroupsListBox is contained in the file level.

High Efficiency Image File Format (HEIF) is a standard developed by the Moving Picture Experts Group (MPEG) for storage of images and image sequences. HEIF includes features building on top of the used ISO Base Media File Format (ISOBMFF). The ISOBMFF structures and features are used to a large extent in the design of HEIF. The basic design for HEIF comprises still images that are stored as items and image sequences that are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

HEIF supports derived image items. An item is a derived image item, when it includes a 'dimg' item reference to another item. A derived image is obtained by performing a specified operation (a.k.a. image operation), such as rotation, to specified input images. The operation performed to obtain the derived image is identified by the item_type of the item. The image items used as input to a derived image may be coded images or they may be other derived image items.

Any number of image items can be included in the same file. Given a collection of images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl', respectively.

In VVC, a partitioning of a picture to subpictures (a.k.a. a subpicture layout or a layout of subpictures) may be indicated in and/or decoded from a sequence parameter set (SPS). In VVC Draft 7, the SPS syntax indicates the partitioning of a picture to subpictures by providing for each subpicture syntax elements indicative of: the x and y coordinates of the top-left corner of the subpicture, the width of the subpicture, and the height of the subpicture, in coding tree units (CTU). Thus, a subpicture layout indicates the positions, widths, and heights of subpictures within a picture but does not assign subpictures or subpicture sequences of any particular identifiers to the subpicture layout.

In addition to the subpicture layout, one or more of the following properties may be indicated (e.g. by an encoder) or decoded (e.g. by a decoder) or inferred (e.g. by an encoder and/or a decoder) for the subpictures collectively or per each subpicture individually:
  i) whether or not a subpicture is treated as a picture in the decoding process; in some cases, this property excludes in-loop filtering operations, which may be separately indicated/decoded/inferred;
  ii) whether or not in-loop filtering operations are performed across the subpicture boundaries.

In VVC Draft 7, a subpicture identifier (i.e. syntax element slice_subpic_id) is indicated (e.g. by an encoder) in and/or decoded (e.g. by a decoder) from a slice header. slice_subpic_id specifies the subpicture identifier of the subpicture that contains the slice. slice_subpic_id is coded as a fixed-length unsigned integer, u(v), whose length is indicated in the referenced SPS, PPS (Picture Parameter Set) or PH (Picture Header); when the length is not indicated, the length is derived based on the number of subpictures indicated in the referenced SPS.

When rectangular slices are in use in VVC Draft 7, slice headers include the slice_address syntax element, which is slice index of the slice within the subpicture identified by slice_subpic_id.

In VVC Draft 7, a SPS, PPS or PH contains a list of subpicture identifier values, i.e. sps_subpic_id[i], pps_subpic_id[i] or ph_subpic_id[i], respectively, for i in the range of 0 to the number of subpicture in the subpicture layout minus 1, inclusive. It may be indicated in the SPS that the list of subpicture identifier values is unchanged for the entire coded video sequence. If the SPS allows changes of the list of subpicture identifier values within a coded video sequence, pps_subpic_id[i] or ph_subpic_id[i], whichever is present and applies to the picture, specifies the subpicture ID of the i-th subpicture. When both the PPS applying to a picture and the picture header of the picture contain list of subpicture identifier values, the list in the picture header has precedence. Decoders may use the list of subpicture identifier values to locate decoded subpictures in a correct position according to the subpicture layout.

In VVC Draft 7, a PH syntax related to subpicture identifier values may be as follows:

| picture_header_rbsp( ) { | Descriptor |
|---|---|
| ... | |
|   if( sps_subpic_id_present_flag && !sps_subpic_id_signalling_flag ) { | |
|     ph_subpic_id_signalling_present_flag | u(1) |
|     if( ph_subpics_id_signalling_present_flag ) { | |
|       ph_subpic_id_len_minus1 | ue(v) |
|       for( i = 0; i <= sps_num_subpics_minus1; i++ ) | |
|         ph_subpic_id[i ] | u(v) |
|     } | |
|   } | |
| ... | |

In VVC Draft 7, semantics of PH syntax elements related to subpicture identifier values may be specified as follows:
  ph_subpic_id_signalling_present_flag equal to 1 specifies that subpicture ID mapping is signalled in the PH. ph_subpic_id_signalling_present_flag equal to 0 specifies that subpicture ID mapping is not signalled in the PH.
  ph_subpic_id_len_minus1 plus 1 specifies the number of bits used to represent the syntax element ph_subpic_id[i].
  It may be required for bitstream conformance that the value of ph_subpic_id_len_minus1 shall be the same for all PHs that are referred to by coded pictures in a CLVS.
  ph_subpic_id[i] specifies that subpicture ID of the i-th subpicture. The length of the ph_subpic_id[i] syntax element is ph_subpic_id_len_minus1+1 bits.

It is envisioned that extraction of subpicture sequences from one or more "source" VVC bitstreams and merging the extracted subpicture sequences to a "destination" VVC bitstream can be performed as follows:
  when encoding the source VVC bitstreams, the slice_subpic_id value of each subpicture sequences may be selected to differ from other slice_subpic_id values among all the source VVC bitstreams, and the length of the slice_subpic_id syntax element may be selected to be the same in the source VVC bitstreams.
  the SPS(s) of the destination VVC bitstream is authored or rewritten based on the SPS(s) of the source VVC bitstreams. The SPS authoring may include one or more of the following:
    the subpicture layout indicated in each SPS is created based on the subpictures that are merged into the destination VVC bitstream
    picture width and height are indicated in each SPS based on the subpicture that are merged into the destination VVC bitstream
  the PPS(s) of the destination VVC bitstream is authored or rewritten based on the PPS(s) of the source VVC bitstreams. The PPS authoring may include one or more of the following:
    picture width and height are indicated in each PPS based on the subpictures that are merged into the destination VVC bitstream
    authoring a list of subpicture identifier values, i.e. pps_subpic_id[i], for i in the range of 0 to the number of subpictures in the subpicture layout minus 1, inclusive, according to the subpictures that are merged into the destination VVC bitstream.
  Picture headers of the destination VVC bitstream are authored or rewritten based on the respective picture headers of the source VVC bitstreams. The picture header authoring may include one or more of the following:
    authoring a list of subpicture identifier values, i.e. ph_subpic_id[i], for i in the range of 0 to the number of subpictures in the subpicture layout minus 1, inclusive, according to the subpictures that are merged into the destination VVC bitstream.
  for each coded picture in the destination VVC bitstream, the subpictures from the respective coded picture in the source VVC bitstream(s) are included e.g. in the order indicated by the list of subpicture identifier values.

As described above, the VVC subpicture feature enables extraction and merging of subpictures without modifications of VCL NAL units (i.e. slices). Thus a fundamental difference in VVC subpicture extraction and merging compared to HEVC motion-constrained tile set extraction and merging is that slice headers need not to be rewritten.

AVC and HEVC Extractors

Extractors specified in ISO/IEC 14496-15 for H.264/AVC and HEVC enable compact formation of tracks that extract NAL unit data by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. A sample constructor extracts, by reference, NAL unit data from a sample of another track. An in-line constructor includes NAL unit data. The term in-line may be defined e.g. in relation to a data unit to indicate that a containing syntax structure contains or carries the data unit (as opposed to includes the data unit by reference or through a data pointer). When an extractor is processed by a file reader that requires it, the extractor is logically replaced by the bytes resulting when resolving the contained constructors in their appearance order. Nested extraction may be disallowed, e.g. the bytes referred to by a sample constructor shall not contain extractors; an extractor shall not reference, directly or indirectly, another extractor. An extractor may contain one or more constructors for extracting data from the current track or from another track that is linked to the track in which the extractor resides by means of a track reference of type 'scal'. The bytes of a resolved extractor may represent one or more entire NAL units. A resolved extractor starts with a valid length field and a NAL unit header. The bytes of a sample constructor are copied only from the single identified sample in the track referenced through the indicated 'scal' track reference. The alignment is on decoding time, i.e. using the time-to-sample table only, followed by a counted offset in sample number. Extractors are a media-level concept and hence apply to the destination track before any edit list is considered. (However, one would normally expect that the edit lists in the two tracks would be identical).

The following syntax may be used:

```
class aligned(8) Extractor ( ) {
  NALUnitHeader( );
  do {
    unsigned int(8) constructor_type;
    if( constructor_type == 0 )
      SampleConstructor( );
    else if( constructor_type == 2 )
      InlineConstructor ( );
  } while ( !EndOfNALUnit ( ) )
}
```

The semantics may be defined as follows:
NALUnitHeader( ): The first two bytes of HEVC NAL units. A particular nal_unit_type value indicates an extractor, e.g. nal_unit_type equal to 49.
constructor type specifies the constructor being used.
EndOfNALUnit( ) is a function that returns 0 (false) when more data follows in this extractor; otherwise it returns 1 (true).

The sample constructor (SampleConstructor) may have the following syntax:

```
class aligned(8) SampleConstructor ( ) {
  unsigned int(8) track_ref_index;
  signed int(8) sample_offset;
  unsigned int((lengthSizeMinusOne+1) *8)
    data_offset ;
  unsigned int((lengthSizeMinusOne+1) *8)
    data_length;
}
``` track ref index identifies the source track from which data is extracted. track_ref index is the index of the track reference of type 'scal'. The first track reference has the index value 1; the value 0 is reserved.

The sample in that track from which data is extracted is temporally aligned or nearest preceding in the media decoding timeline, i.e. using the time-to-sample table only, adjusted by an offset specified by sample_offset with the sample containing the extractor. sample_offset gives the relative index of the sample in the linked track that shall be used as the source of information. Sample 0 (zero) is the sample with the same, or the closest preceding, decoding time compared to the decoding time of the sample containing the extractor; sample 1 (one) is the next sample, sample −1 (minus 1) is the previous sample, and so on.

data_offset: The offset of the first byte within the reference sample to copy. If the extraction starts with the first byte of data in that sample, the offset takes the value 0.

data_length: The number of bytes to copy.

The syntax of the in-line constructor may be specified as follows:

```
class aligned(8) InlineConstructor( ) {
  unsigned int(8) length;
  unsigned int(8) inline_data[length];
}
``` length: the number of bytes that belong to the InlineConstructor following this field. inline_data: the data bytes to be returned when resolving the in-line constructor.

HEVC slice segment headers can be rewritten by the extractor track through inline constructors (which can directly contain slice segment headers).

HEVC Tile Base Tracks and Tile Tracks

An HEVC tile base track represents the bitstream by implicitly combining sample data from the referenced HEVC tile tracks. In HEVC, the 'sabt' track reference is used to refer to tile tracks from a tile base track, and the tile ordering is indicated by the order of the tile tracks contained by a 'sabt' track reference. Furthermore, in HEVC, a tile track has is a 'tbas' track reference to the tile base track.

Samples of HEVC tile tracks contain slice segments. Samples of an HEVC tile track may comprise a motion-constrained tile set sequence.

VVC Subpicture Track Groups (in a Working Draft on Carriage of VVC in ISOBMFF, MPEG N18856)

The storage of VVC in ISOBMFF-compliant file is planned to be specified as new clause(s) in ISO/IEC 14496-15. At the time of writing this document, a Working Draft (WD) on Carriage of VVC in ISOBMFF, MPEG N18856, is available. The WD includes a subpicture track group subclause, which was included in the WD for exploration and discussion. The next paragraphs summarize the feature and contain excerpts from the WD.

Subpicture tracks use regular VVC sample entries. Track grouping is defined which provides level information indicating conformance of a merged bitstream out of several subpicture tracks. Track grouping gives guidance to ease parameter set generation for the reconstructed "destination" bitstreams.

When the coded subpictures within the group that are to be jointly decoded are interchangeable, i.e. the player selects a number of active tracks from a group of sample-wise subpictures with the same level contribution, the sample group type 'acgl' (Active Common Group Level) indicates the combinatorial rules and the level_idc of a resulting combination when decoded jointly.

When there are coded subpictures with different properties, e.g. different resolution, which are selected to be jointly decoded, the sample group type 'amgl' (Active Multiple Group Level) indicates the combinatorial rules and the level_idc of a resulting combination when decoded jointly.

The syntax may be specified as follows:

```
aligned(8) class TrackGroupTypeBox(unsigned int(32)
track_group_type) extends FullBox(track_group_type, version
= 0, flags = 0)
{
  unsigned int(32) track_group_id;
  if track_group_type == 'acgl' {
    unsigned int(32) level_idc;
    unsigned int(32) num_active_tracks;
  }
  if track_group_type == 'amgl' {
    unsigned int(32) level_idc;
    unsigned int(32) track_subgroup_id;
    unsigned int(32) num_subgroup_ids;
    for (i =0; i < num_subgroups_ids; i++ )
    {
      unsigned int(32) included_subgroup_id[ i ];
      unsigned int(32) num_active_tracks[ i ];
    }
  }
}
```

The semantics may be specified as follows:

track_group_type indicates the grouping type.
When track_group_type equals ' acgl', this indicates that this track belongs to a group of tracks with the same value of track_group_id. When track_group_type equals 'amgl', this indicates that this track belongs to a group of tracks with the same value of track_group_id and to a subgroup with the value of track_subgroup_id.

num_active_tracks
When a subset of num_active_tracks tracks is selected from the group with the same value of track_group_id, the playback of the group with track_group_id corresponds to a level of level_idc.

num_subgroup_ids
The number of separate subgroups, each identified by the same value of track_subgroup_id, different subgroups identified by different values of track_subgroup_id, for which a value of level_idc is indicated when a set of subpicture tracks is jointly decoded.

included track_subgroup_id[i]
When playing a subset of tracks with the same value of track_group_id that consists of num_active_tracks [i] tracks selected from each respective subgroup of tracks with track_subgroup_id equal to included_subgroup_id [i], for i ranging from 0 to num_subgroup_ids, the playback of the group corresponds to a level of level_idc.

For enabling storage of VVC subpicture tracks and their merging, an approach, such as extractor tracks, has the following shortcomings or problems:

An extractor-like approach is costly in byte count overhead. Since extractors are included in each sample, they incur a relatively high cost in terms of byte count overhead;

An extractor-like approach is unnecessarily flexible, because it enables any modifications of NAL units, such as rewriting of slice headers, and in VVC subpicture merging no changes in VCL NAL units are required.

When reconstructing the bitstream from an HEVC tile base track and the reference HEVC tile tracks, slice segment headers are not rewritten when resolving and HEVC tile base track. Thus HEVC tile base tracks can only represent a source bitstream, not subsets thereof. Thus, for enabling storage of VVC subpicture tracks and their merging, an approach using tile base tracks and tile tracks as in HEVC file format is:

not flexible to let a player to choose subsets of subpictures of more than one source VVC bitstreams;

not flexible to have time-varying changes in subpicture layout.

A VVC subpicture track group approach in the WD (MPEG N18856):
  requires clients to parse the source VVC bitstream(s) and decode parts of it/hem (parameter sets, PH). The parsing and decoding can be a relatively complex operation involving, e.g.:
    removal of start code emulation prevention bytes from NAL units to obtain RBSPs (Raw Byte Sequence Payload);
    keeping track of implicit referencing from each slice header to a picture header and of explicit referencing from each slice header to PPS, SPS, and VPS (Video Parameter Set) and between parameter sets of different types. Parsing and decoding based on the syntax element values of the referenced syntax structures.
  requires clients to "compose" the destination VVC bitstream and encode parts of it (parameter sets, PH). The "composing" and encoding can be a relatively complex operation involving, e.g.:
    rewriting parameter sets and picture headers based on the source subpicture tracks selected for merging
    keeping track of implicit referencing from each slide header to a picture header and of explicit referencing from each slice header to PPS, SPS, and VPS, and between parameter sets of different types. Encoding based on the syntax element values of the referenced syntax structures.
    insertion of start code emulation prevention bytes to obtain NAL units from created RBSPs
  requires each subpicture track to contain parameter sets and picture headers redundantly when the subpicture track is not intended to be played without other subpicture tracks.

The present embodiments provides an improved solution for storage of VVC subpictures in a container file. The container file can be an ISOBMFF-compliant file.

In encoding of a bitstream, two or more subpicture tracks are written into a container file. According to an embodiment, the writing is performed by a file writer or a similar entity generating an instance of the sample group in the container file that contains the two or more subpicture tracks (or alike). In addition, a base track is written to the container file, said base track being intended to be resolved into a video bitstream. In the base track, a layout of subpictures is indicated. Further, a sample group description entry is written in the container file. The sample group description entry is indicative of a first subpicture track or a group of subpicture tracks for each subpicture position in the layout of subpicture. It is also indicated in the container file, samples of the base track for which the sample group description entry is intended to be used for reconstructing the video bitstream.

In decoding of a bitstream, a layout of subpictures is parsed from a base track of a container file. In addition, a sample group description entry indicative of a first subpicture track or a group of subpicture tracks for each subpicture position in the layout of subpictures is parsed from the container file. A second subpicture track is selected from the group of subpicture tracks, when the sample group description entry is indicative of a group of subpicture tracks. Further, it is parsed from the container file, which set of samples of the base track the sample group description entry is intended to be used for reconstructing the video bitstream. According to an embodiment, a file reader or similar entity parses the instances of the sample group from the container file containing the two or more subpicture tracks (or alike).

Finally, coded pictures of a video bitstream corresponding to the set of samples are reconstructed from the container file by including time-aligned samples of the first sub picture track or the second subpicture track for each subpicture position of the layout of subpictures.

The first subpicture track comprises the subpicture sequence for the respective subpicture position, and wherein any track among the group of subpicture tracks comprises a valid subpicture sequence for the respective subpicture position. It may be defined that a VVC subpicture track contains a sequence of subpictures with the same subpicture identifier (ID). In a first alternative, it may be defined that a VVC subpicture track contains one or more time-wise concatenated sequences of subpictures, which may have different subpicture identifiers. The first subpicture in decoding order when a subpicture identifier changes may be a subpicture of a CLVSS picture. In a second alternative, it may be defined that a VVC subpicture track contains one or more sequences of subpictures. When there are more than one sequences of subpictures, subpictures of each sequence are spatially adjacent and may be treated like a single subpicture. It is also possible to combine the first and second alternatives to a third alternative.

When describing the present embodiments, terms "base track" and "VVC base track" are used interchangeably. Likewise, terms "subpicture track" and "VVC subpicture track" are used interchangeably. Even if an embodiment is described with reference to VVC base track and/or VVC subpicture track, the embodiment is not limited to VVC but applies to any video coding scheme with a concept equivalent or similar to VVC subpictures.

The present solution also provides a sample group of a new type, which is further specified in the subsequent paragraphs. Hereafter the sample group of the new type has the four-character code 'spor' (standing for "subpicture order"), but it needs to be understood that any other four-character code could likewise be used.

The 'spor' sample group is intended to be used in a VVC base track, which a file reader or a similar entity resolves into a VVC destination bitstream. A VVC base track references VVC subpicture tracks from which the VVC destination bitstream can be derived, as will be described.

Each sample group description entry of the 'spor' sample group indicates subpictures in decoding order, where a subpicture is indicated with an index of the track reference of a particular type. Hereafter, the track reference of type 'subp' is used, but it needs to be understood that any other four-character code could likewise be used.

The syntax of a 'spor' sample group description entry may be specified as follows:

```
aligned(8) class VvcSubPicOrderEntry( ) extends
VisualSampleGroupEntry('spor')
{
  unsigned int(16) num_subpics;
  for (i = 0; i < num_subpics; i++)
    unsigned int(16) subp_track_ref_idx;
}
```

The loop of subp_track_ref_idx values specifies the indices of track reference of type 'subp' in decoding order. In other resolving the track references in the order given in the sample group description entry results into a valid VVC destination bitstream.

In another embodiment, each sample group description entry of the 'spor' sample group indicates subpictures in decoding order, where a subpicture is indicated with an identifier of a track (track_ID) or track group (track_group_id).

In another embodiment, each sample group description entry of the 'spor' sample group indicates subpictures in decoding order, where a subpicture is indicated with an index of an entity group of a particular or indicated type and an indicated or inferred identifier (group_id). An entity group identifier may be inferred for example to be the group_id of such an entity group where the track_ID value of the VVC base track appears as the first listed entity_id. The entity group may contain (as entity_id values) track_ID values of VVC subpicture tracks and/or item_ID values of VVC subpicture image items. A player or alike may resolve a reference to an index to an entity group by selecting one of the entities of the group (excluding the entity indicating the VVC base track, if any).

In another embodiment, each sample group description entry of the 'spor' sample group indicates subpictures in decoding order, where a subpicture is indicated with an index of the track reference of a particular type. The track reference may be an identifier of a track (track_ID), an identifier of a track group (track_group_id) of a particular type, or an identifier of an entity group (group_id) of a particular type. When the track reference is an identifier of a track group, a player or alike resolves the reference by selecting one of the tracks in the track group. When the track reference is an identifier of an entity group, a player or alike resolves the reference by selecting one of the entities in the entity group, where the entities may for example be image items.

Embodiments that enable referencing to both samples and image items from a 'spor' sample group description entry may be used for example to combine subpictures of static background image items and dynamically changing foreground subpictures. There may be many applications or use cases that can benefit from such combinations. For example, a movie screen or a television set with 2D video content may be embedded into 360° static image background, and omnidirectional viewing may happen e.g. with a head-mounted display. In another example, a cinemagraph or alike is composed where only part(s) of the scene are dynamic while the remaining areas are static.

In an embodiment, sample group description entries additionally comprise one or more of the following:
a first indication if subpicture IDs are carried in SPS NAL units included in the VVC base track;
a second indication if subpicture IDs are carried in PPS NAL units included in the VVC base track;
a third indication (referred to as ph_subpic_id_flag in the syntax below) if subpicture IDs are carried in picture header (PH) NAL units included in the VVC base track.

In an embodiment, if the first indication indicates that subpicture IDs are carried in SPS NAL units included in the VVC base track, the sample group description entry comprises one or more of the following:
SPS NAL unit applying to the samples mapped to this sample group description entry
SPS RBSP applying to the samples mapped to this sample group description entry
a SPS identifier value referencing the respective identifier value (i.e. sps_seq_parameter_set_id in a draft VVC standard) in a SPS provided in the VVC base track, the SPS applying to the samples mapped to this sample group description entry
an index among SPS NAL units provided in the sample entry of the VVC base track, the index pointing to a SPS NAL unit applying to the samples mapped to this sample group description entry
an index among NAL units (of any type) provided in the sample entry of the VVC base track, the index pointing to a SPS NAL unit applying to the samples mapped to this sample group description entry
the length (in bits) of subpicture identifier (i.e., sps_subpic_id[i]) syntax elements in the SPS RBSP,
the bit position of the first subpicture identifier syntax element (i.e., sps_subpic_id[0] in the referenced or included SPS NAL unit or SPS RBSP, and
a flag indicating if start code emulation prevention bytes are present before or within the subpicture identifier syntax elements (i.e., sps_subpic_id[i]). This flag may alternatively be expressed to indicate if the bit position of sps_subpic_id[i] with any valid value of i in the SPS NAL unit differs from that in SPS RBSP.

In an embodiment, if the second indication indicates that subpicture IDs are carried in PPS NAL units included in the VVC base track, the sample group description entry comprises one or more of the following:
PPS NAL unit applying to the samples mapped to this sample group description entry
PPS RBSP applying to the samples mapped to this sample group description entry
a PPS identifier value referencing the respective identifier value (i.e. pps_pic_parameter_set_id in a draft VVC standard) in a PPS provided in the VVC base track, the PPS applying to the samples mapped to this sample group description entry
an index among PPS NAL units provided in the sample entry of the VVC base track, the index pointing to a PPS NAL unit applying to the samples mapped to this sample group description entry
an index among NAL units (of any type) provided in the sample entry of the VVC base track, the index pointing to a PPS NAL unit applying to the samples mapped to this sample group description entry
the length (in bits) of subpicture identifier (i.e., pps_subpic_id[i]) syntax elements in the PPS RBSP,
the bit position of the first subpicture identifier syntax element (i.e., pps_subpic_id[0] in the referenced or included PPS NAL unit or PPS RBSP, and
a flag indicating if start code emulation prevention bytes are present before or within the subpicture identifier syntax elements (i.e., pps_subpic_id[i]). This flag may alternatively be expressed to indicate if the bit position of pps_subpic_id[i] with any valid value of i in the PPS NAL unit differs from that in PPS RBSP.

In an embodiment, if the third indication indicates that subpicture IDs are carried in picture header (PH) NAL units included in the VVC base track, the sample group description entry comprises one or more of the following:
the length (in bits) of subpicture identifier (i.e., ph_subpic_id[i]) syntax elements in the PH RBSP (referred to as ph_subpic_id_len_minus1 in the syntax below),
the bit position of the first subpicture identifier syntax element (i.e., ph_subpic_id[0] in the PH RBSP (referred to as ph_subpic_id_bit_pos in the syntax below), and
a flag (referred to as ph_start_code_emul_flag in the syntax below) indicating if start code emulation prevention bytes are present before or within the subpicture identifier syntax elements (i.e., ph_subpic_id[i]). This flag may alternatively be expressed to indicate if the bit position of ph_subpic_id[i] with any valid value of i in the PH NAL unit differs from that in PH RBSP.

In an example embodiment related to the third indication, the syntax of a 'spor' sample group description entry may be specified as follows:

```
aligned(8) class VvcSubPicOrderEntry( ) extends
VisualSampleGroupEntry('spor')
{
  unsigned int(16) num_subpics;
  for (i = 0; i < num_subpics; i++)
    unsigned int(16) subp_track_ref_idx;
  unsigned int(1) ph_subpic_id_flag;
  if (ph_subpic_id_flag) {
    unsigned int(1) ph_start_code_emul_flag;
    unsigned int(4) ph_subpic_id_len_minus1;
    unsigned int(10) ph_subpic_id_bit_pos;
  } else
    bit(15) reserved = 0;
}
```

The syntax related to the first indication and/or the second indication may be realized similarly to the syntax above. The syntax may cover aspects related one or more of the first, second, and third indications similar to the syntax above.

In the following, VVC subpicture tracks and VVC base tracks are discussed in more detailed manner.

Track Group of VVC Subpicture Tracks

According to an embodiment, the group of subpicture tracks is indicated by a file writer or a similar entity as a track group in the container file and/or parsed by a file reader or a similar entity from a track group in the container. For example, the group of subpicture tracks may be an 'alte' track group that collects the VVC subpicture tracks. From these VVC subpicture tracks, any track can be interchangeably selected for resolving a VVC base track. The tracks in the same 'alte' track group have the same width, height, and subpicture boundary properties.

While a track group with the 'alte' four-character code is referred to by the present embodiments, the embodiments generally apply to any four-character code for a track group.

Sample Entry for VVC Subpicture Track

If the VVC subpicture track is suitable to be consumed without other VVC subpicture tracks, a regular VVC sample entry may be used (i.e., 'vvc1' or 'vvi1' according to MPEG N18856).

According to an embodiment, a specific sample entry type, herein 'vvs1' (but embodiments generally apply to any four-character code), is used for a VVC subpicture track. It may be specified that when this specific sample entry type is used, VPS, DPS, SPS, PPS, AUD (Access Unit Delimiter), PH, EOS (End of Sequence), and EOB (End of Bitstream) NAL units are absent both in the sample entry and in the samples.

According to an embodiment, a sample entry of a VVC subpicture track comprises one or more of the following:

Subpicture ID, which may be required to be equal to the value of slice_subpic_id in all slices that are present in the samples of the track.

Subpicture position ID. When VVC subpicture tracks have the same subpicture position ID value, they represent the same original content and have the same width and height.

According to an embodiment, a sample entry of a VVC subpicture track having two or more subpictures, comprises one or more of the following:

Subpicture IDs, which may be required to be equal to the values of the slice_subpic_id in the slices of the respective subpictures that are present in the samples of the track.

Subpicture position IDs. When VVC subpicture tracks have the same subpicture position ID values, they represent the same original content and have the same width and height.

For example, the sample entry of a VVC subpicture track may contain a specific box, herein referred to as a subpicture properties box (SubPicPropertiesBox), which carries the above-described syntax elements.

VVC Base Track

According to an embodiment, the VVC base track has a regular VVC sample entry type (i.e., 'vvc1' or 'vvi1' according MPEG N18856). By including the 'subp' track reference in a track, a file writer or a similar entity may indicate that the track is a VVC base track rather than a regular self-contained VVC track. In another embodiment, specific sample entry type(s) (e.g. 'vvcb') may be specified to indicate that a track is a VVC base track.

While a sample entry type with the 'vvcb' four-character code is referred to by embodiments, the embodiments generally apply to any four-character code for a sample entry type to indicate a VVC base track.

According to an embodiment, samples of the VVC base track do not contain VCL NAL units. According to another embodiment, samples of the VVC base track are allowed to contain VCL NAL units. A file writer or a similar entity may for example include VCL NAL units of such subpicture sequences in the VVC base track that are intended to be always present in the destination VVC bitstream.

According to an embodiment, instances of parameters sets (such as VPS, DPS, SPS, and/or PPS NAL units) applying to the resolved VVC base track (i.e. the destination VVC bitstream) are included e.g. by a file writer in the sample entries or samples of the VVC base track.

Some embodiments described above allow referencing both samples and image items from a 'spor' sample group description entry. According to an embodiment, when a sample group description entry is resolved so that both one or more samples of VVC subpicture tracks and one or more VVC subpicture items are used in resolving a sample of a VVC base track, picture-level syntax, such as PPS with mixed_nalu_types_in_pic_flag equal to 1, is used to indicate that the coded picture resolved from the sample of the VVC base track contains mixed NAL unit types. In an embodiment, a file writer or alike includes and/or references picture-level syntax, such as PPS, indicating mixed NAL unit types in all samples of the VVC base track mapped a sample group description entry referencing both samples and image items. In an embodiment, syntax elements indicating the picture order count (e.g. slice_pic_order_cnt_lsb in a draft VVC standard) of the subpicture image items are rewritten (as a part of resolving a sample of the VVC base track) to be the same as the value(s) of the respective syntax element(s) in the selected VVC subpicture tracks.

According to an embodiment, instances of EOS and EOB NAL units, if any, applying to the resolved VVC base track (i.e. the destination VVC bitstream) are included in the samples of the VVC base track. It may be required that they are not succeeded by any other NAL units in the same sample.

The present embodiments are further discussed by means of the following examples.

Mixed-Quality Subpicture Merging

FIG. 1 is an example of how VVC subpicture tracks are used for viewport-dependent omnidirectional video streaming. In here, term "omnidirectional" may refer to media content that may have greater spatial extent than a field-of-view of a device rendering the content. Omnidirectional content may for example cover substantially 360 degrees in the horizontal dimension and substantially 180 degrees in the vertical dimension, but omnidirectional may also refer to content covering less than 360 degree view in the horizontal direction and/or 180 degree view in the vertical direction.

An omnidirectional image can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. An ERP image may be formed from a set of input images, such as fisheye images of a camera array or a camera device with multiple lenses and sensors, which are stitched onto a spherical image. The spherical image is further projected onto a cylinder (without the top and bottom faces). The cylinder is unfolded to form a two-dimensional projected frame. In practice one or more of the presented steps may be merged; for example, the input images may be directly projected onto a cylinder without an intermediate projection onto a sphere. The projection structure for equirectangular projection may be considered to be a cylinder that comprises a single surface.

In general, omnidirectional content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane.

Viewport, on the other hand, may be defined as a region of omnidirectional image or video suitable for display and viewing by the user. A current viewport (which may be referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport.

The viewport-dependent video refers to a content, where the region(s) that lie within the viewport are treated differently than the rest of the omnidirectional content (e.g. by encoding the viewport at a higher quality). Such a content can be provided by the sender to a receiver device based on the viewport orientation.

Region-wise packing information may be encoded as metadata in or along the bitstream. For example, the packing information may comprise a region-wise mapping between a pre-defined or indicated source format (e.g. according an indicated projection format, such as ERP) and the packed frame format (e.g. the decoded pictures or subpictures represented by a track). Region-wise packing information may be included (e.g. by a file writer) in a VVC subpicture track to indicate which sphere region is covered by the track, and may be parsed (e.g. by a player) from VVC subpicture track to conclude which sphere region is covered by the track.

Region-wise packing information may be used in various embodiments for selecting VVC subpicture track(s) from a track group or an entity group. For example, a sphere region covered by a VVC subpicture track may be concluded from the region-wise packing information, and when the sphere region intersects with the viewport, the VVC subpicture track may be selected from the track group or the entity group.

Rectangular region-wise packing metadata is described next: For each region, the metadata defines a rectangle in a projected picture, the respective rectangle in the decoded picture, and an optional transformation of rotation by 90, 180, or 270 degrees and/or horizontal and/or vertical mirroring. Rectangles may for example be indicated by the locations of the top-left corner and the bottom-right corner. The mapping may comprise resampling. As the sizes of the respective rectangles can differ in the projected and decoded pictures, the mechanism infers region-wise resampling.

When VVC subpicture tracks are used for viewport-dependent omnidirectional video streaming, in encoding, a 4×2 tile grid can be used in forming of the subpicture for pictures of equirectangular projection (ERP). Two VVC bitstreams originating from the same source content are encoded at different picture qualities and bitrates. For creating VVC subpicture tracks, each subpicture sequence may be included in one VVC subpicture track. Each pair of VVC subpicture tracks that represent the same content, i.e. have the same position within the ERP picture, are indicated to be members of the same 'alte' track group. The track_group_id values g1, . . . , g8 are uniquely selected and are not equal to any track_ID value.

VVC base track is created to contain a track reference of type 'subp' listing the track_group_id values g1, . . . , g8. All of the track_group_id values g1, . . . , g8 may be listed. The VVC base track may also contain a 'spor' sample group with a single sample group description entry that contains a list of indices to the 'subp' track reference, i.e. values 1, . . . , 8 and may be indicated to be the default that applies to all samples of the track.

In player operation, the player may choose for example the quality and/or the bitrate at which each VVC subpicture track among the same 'alte' track group is received based on certain conditions (e.g., the viewing orientation, network bandwidth). In this example, the player receives VVC subpicture tracks 1, 2, 5, and 6 at a particular quality and VVC subpicture tracks 3, 4, 7, and 8 at another quality. The VVC base track is used to reconstruct a VVC bitstream that can be decoded with a single VVC decoder.

Mixed-Resolution Subpicture Merging

Another example is discussed in the following with reference to specific resolutions or pixel counts in width and/or height. It needs to be understood that the resolutions and pixel counts are given as examples, and the example embodiment could be similarly applied to any choices of resolutions and pixel counts.

Figure 2:
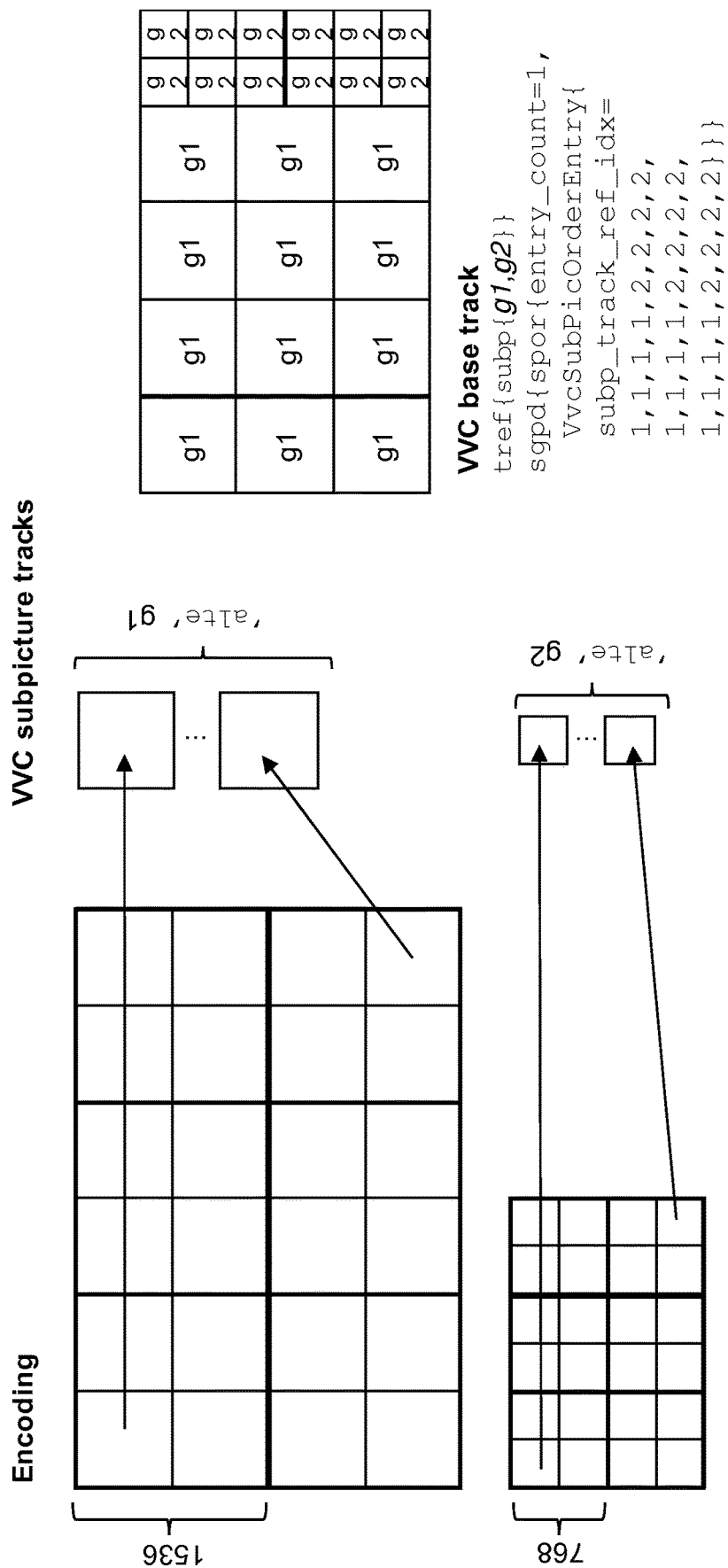
FIG. 2 shows a second example of using VVC subpicture tracks.

Cubemap resolution with cube faces of 1536×1536 samples could be considered to approximately equivalent to 6144×3072 ERP in terms of sampling density. In the presented arrangement, high-resolution tiles are extracted from a cubemap with face size 1536×1536 and could be considered to cover a hemisphere. The remaining tiles may be extracted from a cubemap having a quarter resolution compared to the high-resolution bitstream. This resolution is asserted to meet the capability of head-mounted display with a Quad HD (2560×1440) display panel. The presented scheme is also asserted to provide a reasonable margin for viewing orientation changes caused e.g., by head movements on HMD-based viewing. This arrangement is illustrated in FIG. 2 and explained below.

In encoding, the content may be encoded at two spatial resolutions with cube face size 1536×1536 and 768×768, respectively. In both bitstreams a 6×4 subpicture grid may be used.

For creating VVC subpicture tracks, coded subpicture sequences are stored as corresponding VVC subpicture tracks. Subpicture tracks that have the same width and height are indicated to be members of the same 'alte' track group. The track_group_id values g1 and g2 are uniquely selected and are not equal to any track_ID value, For creating a VVC base track, the SPS of the VVC base track specifies a subpicture layout illustrated in the FIG. 2. The VVC base track contains a track reference of type 'subp' listing the track_group_id values g1 and g2. The VVC base track also contains a 'spor' sample group with a single sample group description entry that contains a list of indices to the 'subp' track reference and is indicated to be the default sample group description entry that applies to all samples of the track.

In player operation, a player may choose subpictures that cover the viewport from the high-resolution encoding and the remaining subpicture from the low-resolution encoding. 12 VVC subpicture tracks originating from the high-resolution bitstream are selected and the complementary 12 VVC subpicture tracks originate from the low-resolution bitstream.

It needs to be understood that the sample group description entry presented in FIG. 2 is merely one example resulting into a valid bitstream reconstructed from the VVC base track. The sample group description entry could likewise contain the track reference indices in any order that the VVC standard allows and that are described in the SPS applying to the respective samples of the VVC base track. In a draft VVC standard, it is required that decoding and bitstream order of subpictures of a picture must be such that the subpictures adjacent to the top and left boundaries of any specific subpicture must precede, in decoding and bitstream order, that specific subpicture.

Storage of Picture Headers for the VVC Base Track

According to an embodiment, picture header (PH) NAL units may be included (e.g. by a file writer) in and/or parsed (e.g. by a file reader) from samples of the VVC base track.

According to an embodiment, a sample group of a new type is specified for carriage of PH NAL units as described in the subsequent paragraphs. In an embodiment, a file writer or a similar entity generates an instance of the sample group in a container file. In an embodiment, a file reader or a similar entity parses an instance of the sample group from a container file.

Hereafter the sample group of the new type has the four-character code 'phdr' (standing for "picture header"), but it is appreciated that any other four-character code could be used likewise.

In different embodiments, a 'phdr' sample group description entry contains one of the following:
 a PH NAL unit and zero or more other NAL units, such as SEI NAL units;
 a PH NAL unit;
 a PH NAL unit without the NAL unit header;
 a PH RBSP.

It may be required that if a sample is not mapped to any sample group description entry of a 'phdr' sample group, the sample contains the PH NAL unit.

It has been proposed that the picture header syntax contains syntax elements for deriving picture order count (POC). Since access units of a coded video sequence have different POCs, using a 'phdr' sample group to carry picture headers with correct values for POC related syntax elements would cause an impractical amount of sample group description entries. In an embodiment, a 'phdr' sample group description entry contains one or more of the following:
 Indication(s) if the POC related syntax element(s) in the picture header apply as such for the samples mapped to this sample group description entry or are to be overwritten (when reconstructing the bitstream).
 Indication(s) indicative of how timing information, such as composition times, of the track relates to POC values. For example, a composition time scaling factor may be indicated for converting composition times to POC values. A composition time difference may be derived from the composition time of the current sample subtracted by the composition time of the previous sample for which the POC related syntax elements applied as such. A POC difference may be derived by dividing the composition time difference by the composition time scaling factor. A POC value may be derived by adding the POC difference to the derived POC value of the previous sample for which the POC related syntax elements applied as such. POC related syntax element values may be derived from the POC value.
 Starting bit position of POC related syntax element(s), such as POC LSB value, within the picture header.
 The length (in bits) of POC related syntax element(s).
 Flag(s) indicating if start code emulation prevention bytes are present before or within the POC related syntax element(s).

The use of the 'phdr' sample group may not be limited to VVC base track but a 'phdr' sample group can also or alternatively be used in regular VVC tracks and VVC subpicture tracks. The embodiments described in the following can be used independently and are not limited to be used together with the 'spor' sample group.

If the PH NAL units are identical, in several coded pictures, the storage of PH NAL units can be improved in terms of byte count through the use of the 'phdr' sample group.

Reconstructing a Destination VVC Bitstream

According to an embodiment, a file reader or a similar entity reconstructs a VVC bitstream by resolving a VVC base track. The VVC base track may be resolved in the decoding order of samples of the VVC base track. A sample of a VVC base track is resolved to an access unit in the destination VVC bitstream. The access unit may be resolved to contain the NAL units carried in the sample of the VVC base track and at least the VCL NAL units of the VVC subpicture tracks that are selected among the referenced VVC subpicture tracks, wherein the referencing may be indicated through the 'spor' sample group description entry applying to the sample of the VVC base track and, in some embodiments, through the 'subp' track reference, as described in other embodiments.

According to an embodiment, a file reader or a similar entity indicates the mapping of subpicture IDs to the layout of subpictures by overwriting the subpicture ID syntax elements in SPS, PPS(s), or picture headers.

In an embodiment, a file reader or a similar entity concludes which syntax structure is modified by overwriting the subpicture ID syntax elements using one or more of the following steps:
 The file reader or similar entity concludes which syntax structures contain subpicture ID syntax elements, e.g. based on indications in the 'spor' sample group description entry mapped to samples of the VVC base track. In another example, subpicture IDs are concluded to be carried in the SPS, PPS, or PH NAL unit by parsing SPS, PPS, or PH NAL unit, respectively.
 If more than one syntax structure applying to the samples contains subpicture ID syntax elements, the file reader or similar entity may conclude the precedence order which containing syntax structure comprises the subpicture ID syntax elements that apply to particular sample(s). For example, subpicture IDs in PH may override subpicture IDs in PPS and SPS. The syntax structure that has the highest precedence may be selected to be modified.

The syntax structure to be modified may cause the entire syntax structure to be repeated in the reconstructed bitstream. For example, if a PPS is modified by overwriting the subpicture ID syntax elements with a different set of subpicture IDs that was used previously in a PPS with same PPS identifier value, the file reader or similar entity includes a copy of an entire PPS NAL unit in the coded picture of the reconstructed bitstream for which the set of subpicture IDs apply.

If overwriting the subpicture ID syntax elements is done in a PH NAL unit, the PH NAL unit in which the overwriting is performed is selected to be the PH NAL unit that is present in a sample, if any, or the PH NAL unit of the 'phdr' sample grouping that is mapped to a sample in the VVC base track (if any).

In an embodiment, a file reader or a similar entity overrides the syntax structure selected to be modified to contain the subpicture IDs of the selected subpicture tracks. In an embodiment, the modification according to the 'spor' sample group description entry mapped to this sample is performed as follows:

Starting from the bit position of the first subpicture identifier syntax element in the syntax structure (e.g. the bit position of ph_subpic_id[0] in a picture header to be modified) as indicated in the sample group description entry, overwrite each subpicture identifier syntax element (e.g. ph_subpic_id[i] value in a picture header) with the subpicture ID from each selected VVC subpicture track in the order specified in the sample group description entry.

The NAL units included in the access unit are arranged in an order that complies with the constraints in the VVC specification. It is remarked that these NAL units may have undergone overwriting subpicture identifier values as described above. In an embodiment, a file reader or a similar entity arranges the NAL units in the order of the following bullets (where "the sample" refers to the sample of the VVC base track that is being resolved to an access unit):

The AUD NAL unit, if any, when present (and the first NAL unit) in the sample
  When the sample is the first sample of a sequence of samples associated with the same sample entry, the parameter set NAL units and the SEI NAL units contained in the sample entry, if any. Note that it may be required that only prefix APS and prefix SEI NAL units can be present in sample entries.
  The NAL units, if any, that are present in the sample and precede the first of the following in the sample:
    the PH NAL unit in the sample, if any,
    the first VCL NAL unit in the sample, if any,
    the first NAL unit that is allowed to be the last NAL unit of an AU according to the VVC specification, if any,
    the end of the sample.
  The PH NAL unit that is present in the sample, if any, or the PH NAL unit of the 'phdr' sample grouping that is mapped to the sample.
  The content of time-aligned (in decoding time) resolved sample from each referenced VVC subpicture track in the order specified in the 'spor' sample group description entry mapped to this sample, excluding all VPS, DPS, SPS, PPS, AUD, PH, EOS, and EOB NAL units, if any. The track references are resolved as specified below.
    It is to be noted that if the reference VVC subpicture track is associated with an APS track, the resolved sample contains the APS NAL unit(s), if any, of the time-aligned sample in the APS track
  The remaining NAL units in the sample (that were not included in the access units already above).

The track reference indices of a 'spor' sample group description entry may be resolved as follows:
  If the track reference points to a track ID of a VVC subpicture track, the track reference is resolved to the VVC subpicture track.
  Otherwise (the track reference points to an 'alte' track group), the track reference is resolved to any of the tracks of the 'alte' track group. It may be required that if a particular track reference index value was resolved to a particular track in the previous sample, it shall be resolved in the current sample to either of the following:
    the same particular track, or
    any other track in the same 'alte' track group that contains a sync sample or, in an embodiment, a SAP sample type of 3, that is time-aligned with the current sample.

According to another embodiment, a VVC encoded image can be stored (e.g. by a file writer) and/or parsed (e.g. by a file reader) in/from a file conforming to an image file format, similar to, but not necessarily the same, as the High Efficiency Image File Format (HEIF, ISO/IEC 23008-12), as described in the following. A file writer can form a separate item from each subpicture of the VVC encoded image. A file writer can form and/or a file reader can parse a derived image item, which may be called "VVC derived image item" or "VVC base image item" that merges VVC encoded subpicture into a coded picture. A file writer include and/or a file reader may parse item references from the VVC base image item to the subpicture items in an ordered fashion to indicate (by a file writer) or resolve (by a file reader) the decoding or bitstream order of the subpictures within the coded picture. Such referencing can be done using a new type of item reference ('iref') of type 'spir'. While an item reference of type 'spir' is referred to by embodiments, the embodiments generally apply to any other four-character code too.

According to another embodiment, a file writer may create and/or a file reader may parse an entity group that contains subpicture image items among which any single image item can be interchangeably used to resolve a 'spir' item reference that points to an entity group ID. Consequently, to resolve a VVC derived image item, a player selects a subpicture image item from an entity group. The player may for example select subpicture image items that cover the viewport and omit selecting subpicture image items that do not cover the viewport.

According to another embodiment, rather than using the 'spir' item reference, VVC subpicture items and VVC base item are contained in an entity group which lists the derived VVC image item (or VVC base item) and the other VVC subpicture items, including additional properties in the entity group, if necessary.

Figure 3:
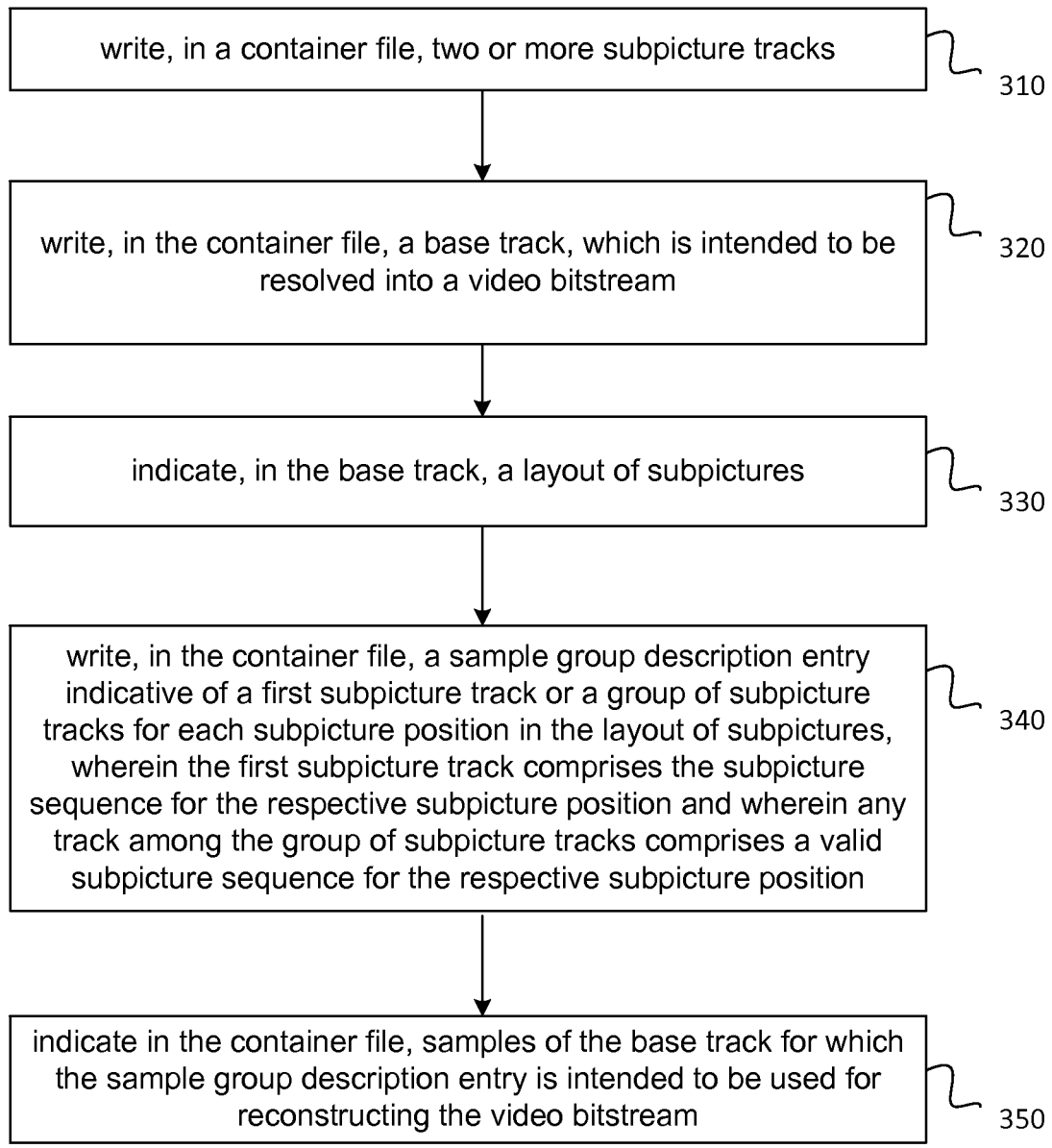
FIG. 3 is a flowchart illustrating a method according to an embodiment.

FIG. 3 is a flowchart illustrating a method according to an embodiment. A method comprises writing 310, in a container file, two or more subpicture tracks; writing 320, in the container file, a base track, which is intended to be resolved into a video bitstream; indicating 330, in the base track, a layout of subpictures; writing 340, in the container file, a sample group description entry indicative of a first subpicture track or a group of subpicture tracks for each subpicture position in the layout of subpictures, wherein the first subpicture track comprises the subpicture sequence for the respective subpicture position and wherein any track among the group of subpicture tracks comprises a valid subpicture sequence for the respective subpicture position; and indicating 350 in the container file, samples of the base track for which the sample group description entry is intended to be used for reconstructing the video bitstream.

An apparatus according to an embodiment comprises means for writing, in a container file, two or more subpicture tracks; means for writing, in the container file, a base track, which is intended to be resolved into a video bitstream; means for indicating, in the base track, a layout of subpictures; means for writing, in the container file, a sample group description entry indicative of a first subpicture track or a group of subpicture tracks for each subpicture position in the layout of subpictures, wherein the first subpicture track comprises the subpicture sequence for the respective subpicture position and wherein any track among the group of subpicture tracks comprises a valid subpicture sequence for the respective subpicture position; and means for indicating in the container file, samples of the base track for which the sample group description entry is intended to be used for reconstructing the video bitstream. The means comprises at least one processor, and a memory including a computer program code, wherein the processor may further comprise processor circuitry. The memory and the computer program code are configured to, with the at least one processor, cause the apparatus to perform the method according to various embodiments.

Figure 4:
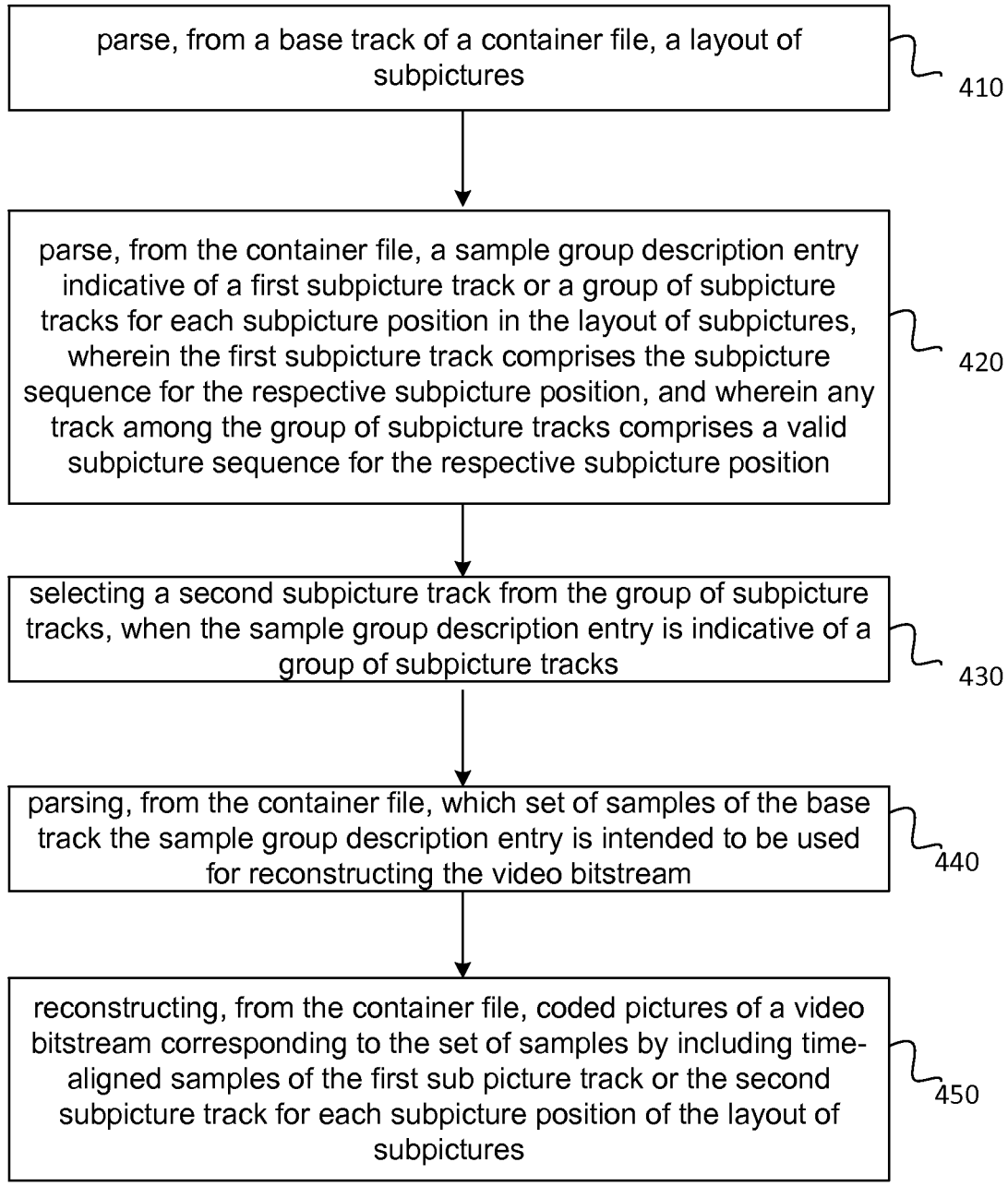
FIG. 4 is a flowchart illustrating a method according to another embodiment.

FIG. 4 is a flowchart illustrating a method according to another embodiment. A method comprises parsing 410, from a base track of a container file, a layout of subpictures; parsing 420, from the container file, a sample group description entry indicative of a first subpicture track or a group of subpicture tracks for each subpicture position in the layout of subpictures, wherein the first subpicture track comprises the subpicture sequence for the respective subpicture position, and wherein any track among the group of subpicture tracks comprises a valid subpicture sequence for the respective subpicture position; selecting 430 a second subpicture track from the group of subpicture tracks, when the sample group description entry is indicative of a group of subpicture tracks; parsing 440, from the container file, which set of samples of the base track the sample group description entry is intended to be used for reconstructing the video bitstream; reconstructing 450, from the container file, coded pictures of a video bitstream corresponding to the set of samples by including time-aligned samples of the first sub picture track or the second subpicture track for each subpicture position of the layout of subpictures.

An apparatus according to an embodiment comprises means for parsing, from a base track of a container file, a layout of subpictures; means for parsing, from the container file, a sample group description entry indicative of a first subpicture track or a group of subpicture tracks for each subpicture position in the layout of subpictures, wherein the first subpicture track comprises the subpicture sequence for the respective subpicture position, and wherein any track among the group of subpicture tracks comprises a valid subpicture sequence for the respective subpicture position; means for selecting a second subpicture track from the group of subpicture tracks, when the sample group description entry is indicative of a group of subpicture tracks; means for parsing, from the container file, which set of samples of the base track the sample group description entry is intended to be used for reconstructing the video bitstream; means for reconstructing, from the container file, coded pictures of a video bitstream corresponding to the set of samples by including time-aligned samples of the first sub picture track or the second subpicture track for each subpicture position of the layout of subpictures. The means comprises at least one processor, and a memory including a computer program code, wherein the processor may further comprise processor circuitry. The memory and the computer program code are configured to, with the at least one processor, cause the apparatus to perform the method according to various embodiments.

Figure 5:
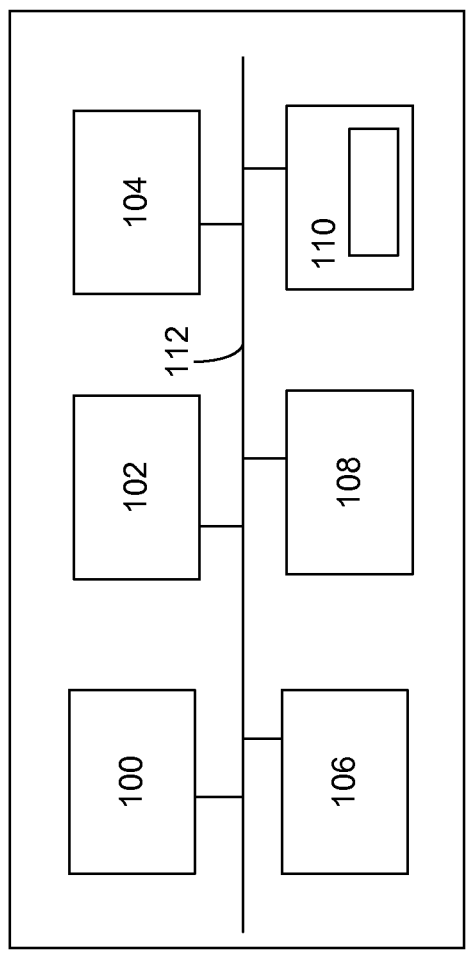
FIG. 5 shows an apparatus according to an embodiment.

An example of a data processing system for an apparatus is illustrated in FIG. 5. Several functionalities can be carried out with a single physical device, e.g. all calculation procedures can be performed in a single processor if desired. The data processing system comprises a main processing unit 100, a memory 102, a storage device 104, an input device 106, an output device 108, and a graphics subsystem 110, which are all connected to each other via a data bus 112.

The main processing unit 100 is a conventional processing unit arranged to process data within the data processing system. The main processing unit 100 may comprise or be implemented as one or more processors or processor circuitry. The memory 102, the storage device 104, the input device 106, and the output device 108 may include conventional components as recognized by those skilled in the art. The memory 102 and storage device 104 store data in the data processing system 100.

Computer program code resides in the memory 102 for implementing, for example a method as illustrated in a flowchart of FIG. 3 or FIG. 4 according to various embodiments. The input device 106 inputs data into the system while the output device 108 receives data from the data processing system and forwards the data, for example to a display. The data bus 112 is a conventional data bus and while shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

Figure 6:
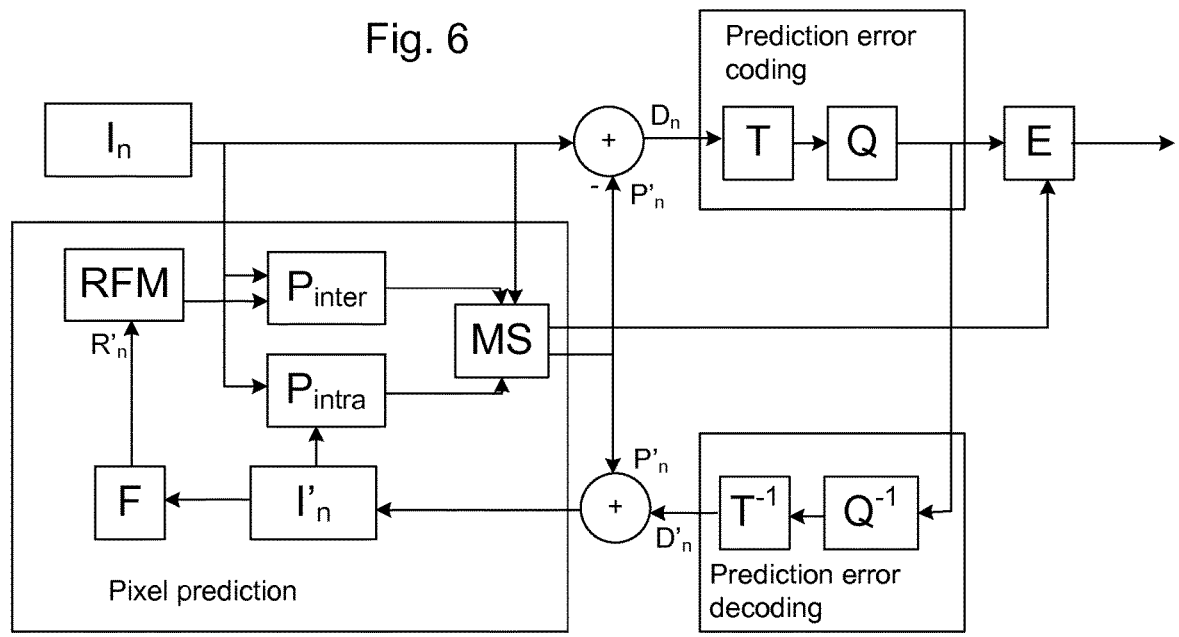
FIG. 6 shows an encoding process according to an embodiment.
Figure 7:
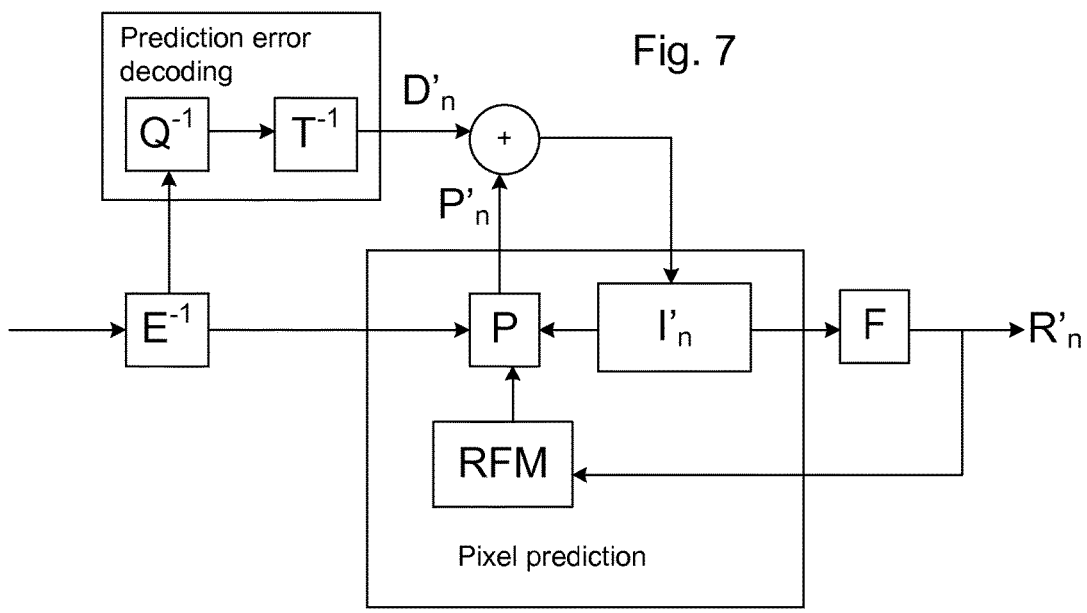
FIG. 7 shows a decoding process according to an embodiment.

FIG. 6 illustrates an example of a video encoder, where $I_n$: Image to be encoded; $P'_n$: Predicted representation of an image block; $D_n$: Prediction error signal; $D'_n$: Reconstructed prediction error signal; I'n: Preliminary reconstructed image; R'n: Final reconstructed image; T, $T^{-1}$: Transform and inverse transform; Q, $Q^{-1}$: Quantization and inverse quantization; E: Entropy encoding; RFM: Reference frame memory; $P_{inter}$: Inter prediction; $P_{intra}$: Intra prediction; MS: Mode selection; F: Filtering. FIG. 7 illustrates a block diagram of a video decoder where $P'_n$: Predicted representation of an image block; $D'_n$: Reconstructed prediction error signal; $I'_n$: Preliminary reconstructed image; $R'_n$: Final reconstructed image; $T^{-1}$: Inverse transform; $Q^{-1}$: Inverse quantization; $E^{-1}$: Entropy decoding; RFM: Reference frame memory; P: Prediction (either inter or intra); F: Filtering. An apparatus according to an embodiment may comprise only an encoder or a decoder, or both.

The various embodiments may provide advantages. For example, compared to using track references without sample grouping (as in HEVC tile base tracks and HEVC tile tracks):

The usage of a sample group provides the possibility for time-varying subpicture layouts.

The usage of a sample group provides the possibility for assigning additional parameters (e.g. length of subpicture identifier and/or bit position of the first subpicture identifier in the PH RBSP). The additional parameters can be time-varying.

In addition, sample groups are inexpensive for byte count overhead. For example, it is assumed to be likely that the bit position of ph_subpic_id[0] remains unchanged in all PH NAL units. Consequently, all pictures of a coded video sequence can be mapped to the same sample group description entry. If the same SPS is used in the entire bitstream, the use of the default sample group description entry can be indicated in the SampleGroupDescriptionBox and SampleToGroupBoxes can be absent. Yet, further, when a track group of subpicture tracks is referenced by the 'subp' track reference, a reader has the freedom to choose a subset of the subpictures of a source bitstream, or a selection of subpictures from more than one source bitstream, or a combination thereof, depending on how track groups have been formed. In addition, reconstructing a VVC bitstream from the selected subpicture tracks may only require overwriting the subpicture identifier (e.g. ph_subpic_id[i]) syntax elements in the picture headers as instructed in the 'spor' sample group.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises writing, in a container file, two or more subpicture tracks; writing, in the container file, a base track, which is intended to be resolved into a video bitstream; indicating, in the base track, a layout of subpictures; writing, in the container file, a sample group description entry indicative of a first subpicture track or a group of subpicture tracks for each subpicture position in the layout of subpictures, wherein the first subpicture track comprises the subpicture sequence for the respective subpicture position and wherein any track among the group of subpicture tracks comprises a valid subpicture sequence for the respective subpicture position; and indicating in the container file, samples of the base track for which the sample group description entry is intended to be used for reconstructing the video bitstream. According to another embodiment, the programmable operational characteristic of the system comprises parsing, from a base track of a container file, a layout of subpictures; parsing, from the container file, a sample group description entry indicative of a first subpicture track or a group of subpicture tracks for each subpicture position in the layout of subpictures, wherein the first subpicture track comprises the subpicture sequence for the respective subpicture position, and wherein any track among the group of subpicture tracks comprises a valid subpicture sequence for the respective subpicture position; selecting a second subpicture track from the group of subpicture tracks, when the sample group description entry is indicative of a group of subpicture tracks; parsing, from the container file, which set of samples of the base track the sample group description entry is intended to be used for reconstructing the video bitstream; reconstructing, from the container file, coded pictures of a video bitstream corresponding to the set of samples by including time-aligned samples of the first sub picture track or the second subpicture track for each subpicture position of the layout of subpictures.

A computer program product according to an embodiment can be embodied on a non-transitory computer readable medium. According to another embodiment, the computer program product can be downloaded over a network in a data packet.

Some embodiments have been described in relation to specific syntax of syntax structures. Embodiments apply to entities generating the described syntax structures and to entities reading, parsing, and/or decoding the described syntax structures.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
   parsing, from a base track of a container file, a layout of subpictures;
   parsing, from the container file, a sample group description entry indicating a first subpicture track or a group of subpicture tracks for at least one subpicture position in the layout of subpictures, wherein the first subpicture track comprises a subpicture sequence for the at least one subpicture position, and wherein a track among the group of subpicture tracks comprises a valid subpicture sequence for the at least one subpicture position;
   selecting a second subpicture track from the group of subpicture tracks, in response to the sample group description entry indicating the group of subpicture tracks;
   parsing, from the container file, a set of samples of the base track the sample group description entry is to be used for reconstructing a video bitstream; and
   reconstructing, from the container file, coded pictures of the video bitstream corresponding to the set of samples, comprising including time-aligned samples of the first subpicture track or the second subpicture track for the at least one subpicture position of the layout of subpictures.

2. The method of claim 1, further comprising:
reading, from the container file, a track reference from the base track to a list of entries, identifying a subpicture track or a track group of subpicture tracks;
and wherein the sample group description entry comprises, for the at least one subpicture position in the layout of subpictures, an index of the list of entries for the at least one subpicture position, where the index indicates the first subpicture track or the group of subpicture tracks.

3. The method of claim 1, wherein the sample group description entry comprises an indication of whether subpicture identification is carried in a parameter set or a picture header included in the base track.

4. The method of claim 3, wherein the sample group description entry comprises one or more of the following:
a length of a subpicture identifier syntax element;
a bit position of an identifier syntax element of the first subpicture; or
a flag indication of whether start code emulation prevention bytes are present before or within the subpicture identifier syntax element.

5. The method of claim 1, wherein a sample entry of a subpicture track comprises one or more of the following:
subpicture identifier; or
subpicture position identifier.

6. The method of claim 1, further comprising:
reading, from the container file, a sample group for picture header network abstraction layer units.

7. The method of claim 1, further comprising:
indicating a mapping of subpicture identifiers to the layout of subpictures.

8. The method of claim 7, further comprising:
overwriting a subpicture identifier in a parameter set or a picture header by performing one or more of the following:
concluding when the subpicture identifiers are carried at least in parameter sets or picture headers;
in response to more than one parameter set or picture header comprising subpicture identifiers, concluding a precedence order between the parameter sets or the picture headers and selecting a parameter set or a picture header that has a highest precedence;
in response to a picture header being selected for overwriting, selecting the picture header for overwriting to be a picture header that is present in a sample or picture header of a sample grouping that is mapped to a sample in the base track; or
modifying the selected parameter set or the selected picture header to contain the subpicture identifiers of selected subpicture tracks.

9. The method of claim 8, further comprising:
starting from a bit position of a first subpicture identifier element and overwrite subpicture identifier element values with a subpicture identifier from the selected subpicture tracks in an order specified in the sample group description entry.

10. An apparatus comprising:
at least one processor; and
at least one non-transitory memory storing instructions that, when executed with the at least one processor, cause the apparatus to perform at least:
parse, from a base track of a container file, a layout of subpictures;
parse, from the container file, a sample group description entry for indicating a first subpicture track or a group of subpicture tracks for at least one subpicture position in the layout of subpictures, wherein the first subpicture track comprises the subpicture sequence for the at least one subpicture position, and wherein a track among the group of subpicture tracks comprises a valid subpicture sequence for the respective at least one subpicture position;
select a second subpicture track from the group of subpicture tracks, in response to the sample group description entry indicates a indicating the group of subpicture tracks;
parse, from the container file, a set of samples of the base track the sample group description entry is to be used for reconstructing a video bitstream; and
reconstruct, from the container file, coded pictures of the video bitstream corresponding to the set of samples, comprising including time-aligned samples of the first subpicture track or the second subpicture track for the at least one subpicture position of the layout of subpictures.

11. An apparatus according to claim 10, wherein the instructions are configured to, with the at least one processor, cause the apparatus to perform at least:
read, from the container file, a track reference from the base track to a list of entries, identifying a subpicture track or a track group of subpicture tracks;
and wherein the sample group description entry comprises, for the at least one subpicture position in the layout of subpictures, an index of the list of entries for the at least one subpicture position, where the index indicates the first subpicture track or the group of subpicture tracks.

12. An apparatus according to claim 10, wherein the sample group description entry comprises an indication of whether subpicture identification is carried in a parameter set or a picture header included in the base track.

13. An apparatus according to claim 11, wherein the sample group description entry comprises one or more of the following:
a length of a subpicture identifier syntax element;
a bit position of an identifier syntax element of the first subpicture; or
a flag indication of whether start code emulation prevention bytes are present before or within the subpicture identifier syntax element.

14. An apparatus according to claim 10, wherein a sample entry of a subpicture track comprises one or more of the following:
subpicture identifier; or
subpicture position identifier.

15. An apparatus according to claim 9, wherein the instructions are configured to, with the at least one processor, cause the apparatus to perform at least:
read, from the container file, a sample group for picture header network abstraction layer units.

16. An apparatus according to claim 9, wherein the instructions are configured to, with the at least one processor, cause the apparatus to perform at least:
indicate a mapping of subpicture identifiers to the layout of subpictures.

17. An apparatus according to claim 15, wherein the instructions are configured to, with the at least one processor, cause the apparatus to:
overwrite a subpicture identifier in a parameter set or a picture header by performing one or more of the following:
conclude when the subpicture identifiers are carried at least in parameter sets or picture headers;

in response to more than one parameter set or picture header comprising subpicture identifiers, conclude a precedence order between the parameter sets or the picture headers and selecting the select a parameter set or a picture header that has a highest precedence;

in response to a picture header being selected for overwriting, select the picture header for overwriting to be a picture header that is present in a sample or picture header of a sample grouping that is mapped to a sample in the base track; or modify the selected parameter set or the selected picture header to contain the subpicture identifiers of selected subpicture tracks.

18. An apparatus according to claim 16, wherein the instructions are configured to, with the at least one processor, cause the apparatus to perform at least:

start from a bit position of a first subpicture identifier element and overwrite subpicture identifier element values with a subpicture identifier from the selected subpicture tracks in an order specified in the sample group description entry.

19. A non-transitory computer readable medium comprising program instructions stored thereon for performing at least the following:

parsing, from a base track of a container file, a layout of subpictures;

parsing, from the container file, a sample group description entry indicating a first subpicture track or a group of subpicture tracks for at least one subpicture position in the layout of subpictures, wherein the first subpicture track comprises a subpicture sequence for the at least one subpicture position, and wherein a track among the group of subpicture tracks comprises a valid subpicture sequence for the at least one subpicture position;

selecting a second subpicture track from the group of subpicture tracks, in response to the sample group description entry indicating the group of subpicture tracks;

parsing, from the container file, a set of samples of the base track the sample group description entry is configured to be used for reconstructing a video bitstream; and reconstructing, from the container file, coded pictures of the video bitstream corresponding to the set of samples, comprising including time-aligned samples of the first subpicture track or the second subpicture track for the at least one subpicture positions of the layout of subpictures.

20. The non-transitory computer readable medium of claim 19, further comprising program instructions stored thereon for performing:

reading, from the container file, a track reference from the base track to a list of entries, identifying a subpicture track or a track group of subpicture tracks;

and wherein the sample group description entry comprises, for the at least one subpicture position in the layout of subpictures, an index of the list of entries for the at least one subpicture position, where the index indicates the first subpicture track or the group of subpicture tracks.

* * * * *